United States Patent
Wang et al.

(10) Patent No.: US 11,909,530 B2
(45) Date of Patent: Feb. 20, 2024

(54) METHODS AND WTRUS OF PROVIDING RANGE EXTENSION FOR WLAN

(71) Applicant: InterDigital Patent Holdings, Inc., Wilmington, DE (US)

(72) Inventors: Xiaofei Wang, Cedar Grove, NJ (US); Hanqing Lou, Syosset, NY (US); Oghenekome Oteri, San Diego, CA (US); Li-Hsiang Sun, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 299 days.

(21) Appl. No.: 17/421,611

(22) PCT Filed: Jan. 10, 2020

(86) PCT No.: PCT/US2020/013168
§ 371 (c)(1),
(2) Date: Jul. 8, 2021

(87) PCT Pub. No.: WO2020/146787
PCT Pub. Date: Jul. 16, 2020

(65) Prior Publication Data
US 2022/0077964 A1 Mar. 10, 2022

Related U.S. Application Data

(60) Provisional application No. 62/790,810, filed on Jan. 10, 2019.

(51) Int. Cl.
*H04L 1/1812* (2023.01)
*H04L 1/00* (2006.01)
(Continued)

(52) U.S. Cl.
CPC ........... *H04L 1/1812* (2013.01); *H04L 1/0025* (2013.01); *H04W 74/004* (2013.01); *H04W 84/12* (2013.01); *H04W 88/10* (2013.01)

(58) Field of Classification Search
CPC ... H04L 1/1812; H04L 1/0025; H04L 1/1864; H04L 1/1825; H04L 1/0013; H04W 74/004; H04W 84/12; H04W 88/10
See application file for complete search history.

(56) References Cited

U.S. PATENT DOCUMENTS

| 9,307,549 B2 | 4/2016 | Fernando et al. |
|---|---|---|
| 9,538,470 B2 | 1/2017 | Choi et al. |

(Continued)

FOREIGN PATENT DOCUMENTS

| CN | 101047974 A | 10/2007 |
|---|---|---|
| CN | 101640561 A | 2/2010 |

(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

(Continued)

*Primary Examiner* — Kan Yuen
(74) *Attorney, Agent, or Firm* — Volpe Koenig

(57) ABSTRACT

A method for use in a wireless transmit/receive unit (WTRU). The method comprises: receiving LRRE information from an AP; determining whether a first condition is satisfied by the WTRU, wherein the first condition is satisfied by the WTRU, on a condition that the first condition is satisfied, sending a mode change request to the AP to change an operation mode to a LRRE HARQ mode; receiving a (Continued)

response regarding the mode change request from the AP; and communicating with the AP using a plurality of PPDUs, each of the PPDUs comprising at least one field enabling transmissions between the WTRU and the AP under the first condition and a LRRE HARQ mode indication.

16 Claims, 24 Drawing Sheets

(51) Int. Cl.
*H04W 74/00* (2009.01)
*H04W 84/12* (2009.01)
*H04W 88/10* (2009.01)

(56) References Cited

U.S. PATENT DOCUMENTS

| | | | |
|---|---|---|---|
| 9,935,802 | B2 | 4/2018 | Choi et al. |
| 11,533,133 | B2* | 12/2022 | Chun ........................ H04L 5/00 |
| 2012/0114019 | A1 | 5/2012 | Wallace et al. |
| 2013/0016696 | A1 | 1/2013 | Adjakple et al. |
| 2017/0367096 | A1 | 12/2017 | Park et al. |
| 2018/0070282 | A1 | 3/2018 | Su et al. |
| 2019/0349144 | A1 | 11/2019 | Yang et al. |
| 2022/0124760 | A1* | 4/2022 | Yang ..................... H04L 5/0053 |

FOREIGN PATENT DOCUMENTS

| | | |
|---|---|---|
| WO | 2017/123862 | 7/2017 |
| WO | 2018017920 A1 | 1/2018 |
| WO | 2018/218220 | 11/2018 |
| WO | 2018232138 A1 | 12/2018 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).

Montemurro, "EHT TIG Agenda," IEEE 802.11-18/1067r2 (Jul. 10, 2018).

Park et al., "Overview of PHY Features for EHT," IEEE 802.11-18/1967r0 (Nov. 12, 2018).

Choi et al., "View on EHT Objectives and Technologies," IEEE 802.11-18/1171r0 (Jul. 8, 2018).

Yang et al., "Discussion on EHT Study Group Formation," IEEE 802.11-18/1180r0 (Jul. 9, 2018).

Porat et al., "Distributed MU-MIMO and HARQ Support for EHT," IEEE 802.11-18/1116r0 (Jul. 6, 2018).

Hart et al., "Recommended Direction for EHT," IEEE 802.11-18/1549r0 (Sep. 9, 2018).

Shilo et al., "HARQ for EHT," IEEE 802.11-18/1587r1 (Sep. 3, 2018).

Asterjadhi et al., "802.11ax operation in 6GHz band," IEEE 802.11-18/1256r0 (Jul. 8, 2018).

Gidvani et al., "6 GHz operation for 11ax," IEEE 802.11-18/1607r1 (Sep. 11, 2018).

Yang et al., "Discussion on HARQ for EHT," IEEE 802.11-18/1963r1 (Nov. 11, 2018).

Shilo et al., "HARQ for EHT—Further Information," IEEE 802.11-18/1955r0 (Nov. 2018).

Oteri et al., "Technology Features for 802.11 EHT," IEEE 802.11-18/1547r0 (Sep. 7, 2018).

Latif et al., "HARQ in EHT," IEEE 802.11-18/2029r0 (Nov. 12, 2018).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D3.0 (Jun. 2018).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D6.0 (Nov. 2019).

Oteri et al., "HARQ in Collision-Free and Collision-Dominated Environments," IEEE 802.11-19/0070r0 (Jan. 13, 2019).

Chu et al, "Operation at 6GHz Band," IEEE P802.11 Wireless LANs, IEEE 802.11-17/0xxxx0 (Aug. 28, 2018).

* cited by examiner

METHODS AND WTRUS OF PROVIDING RANGE EXTENSION FOR WLAN

CROSS-REFERENCE TO RELATED APPLICATIONS

This application is the U.S. National Stage, under 35 U.S.C. § 371, of International Application No. PCT/US2020/013168, filed Jan. 10, 2020, which claims the benefit of U.S. Provisional Application No. 62/790,810, filed Jan. 10, 2019, the contents of which are incorporated herein by reference.

BACKGROUND

Hybrid automatic repeat request (HARQ) is a transmission error control technique in wireless communication networks. It relies on a combination of error correction codes and retransmissions. In unlicensed spectrum such as 6 GHz band, there are currently no legacy wireless local area network (WLAN) devices operating on the 6 GHz band. Thus, methods and apparatuses that enable the WLAN devices to perform HARQ scheduling and medium access in the 6 GHz band as well as HARQ transmissions over a longer range are needed.

SUMMARY

A method for use in a wireless transmit/receive unit (WTRU). The method comprises: receiving low rate range extension (LRRE) information from an access point (AP); and determining whether a first condition is satisfied by the WTRU, on a condition that the first condition is satisfied, sending a mode change request to the AP to change an operation mode to a LRRE hybrid automatic repeat request (HARQ) mode; receiving a response regarding the mode change request from the AP; and communicating with the AP using a plurality of physical layer convergence procedure (PLOP) protocol data units (PPDUs), each of the plurality of PPDUs comprising at least one field enabling transmissions between the WTRU and the AP under the first condition and a LRRE HARQ mode indication.

A wireless transmit/receive unit (WTRU). The WTRU comprises: a receiver configured to receive low rate range extension (LRRE) information from an access point (AP); a transmitter; and a processer configured to determine whether a first condition is satisfied by the WTRU wherein on a condition that the first condition is satisfied, the transmitter is further configured to send a mode change request to the AP to change an operation mode to a LRRE hybrid automatic repeat request (HARQ) mode; the receiver is further configured to receive a response regarding the mode change request from the AP; and the WTRU is configured to communicate with the AP using a plurality of physical layer convergence procedure (PLOP) protocol data units (PPDUs), each of the plurality of PPDUs comprising at least one field enabling transmissions between the WTRU and the AP under the first condition and a LRRE HARQ mode indication.

A method for use in a wireless transmit/receive unit (WTRU). The method comprises: receiving low rate range extension (LRRE) information from an access point (AP); and determining whether a first condition is satisfied by the WTRU, wherein the first condition is satisfied when a channel quality of a channel used by the WTRU is less than a channel quality value, on a condition that the first condition is satisfied, receiving a mode change request from the AP to change an operation mode to a LRRE hybrid automatic repeat request (HARQ) mode; sending a response regarding the mode change request to the AP; and communicating with the AP using a plurality of physical layer convergence procedure (PLOP) protocol data units (PPDUs), each of the plurality of PPDUs comprising at least one field enabling transmissions between the WTRU and the AP under the first condition and a LRRE HARQ mode indication.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
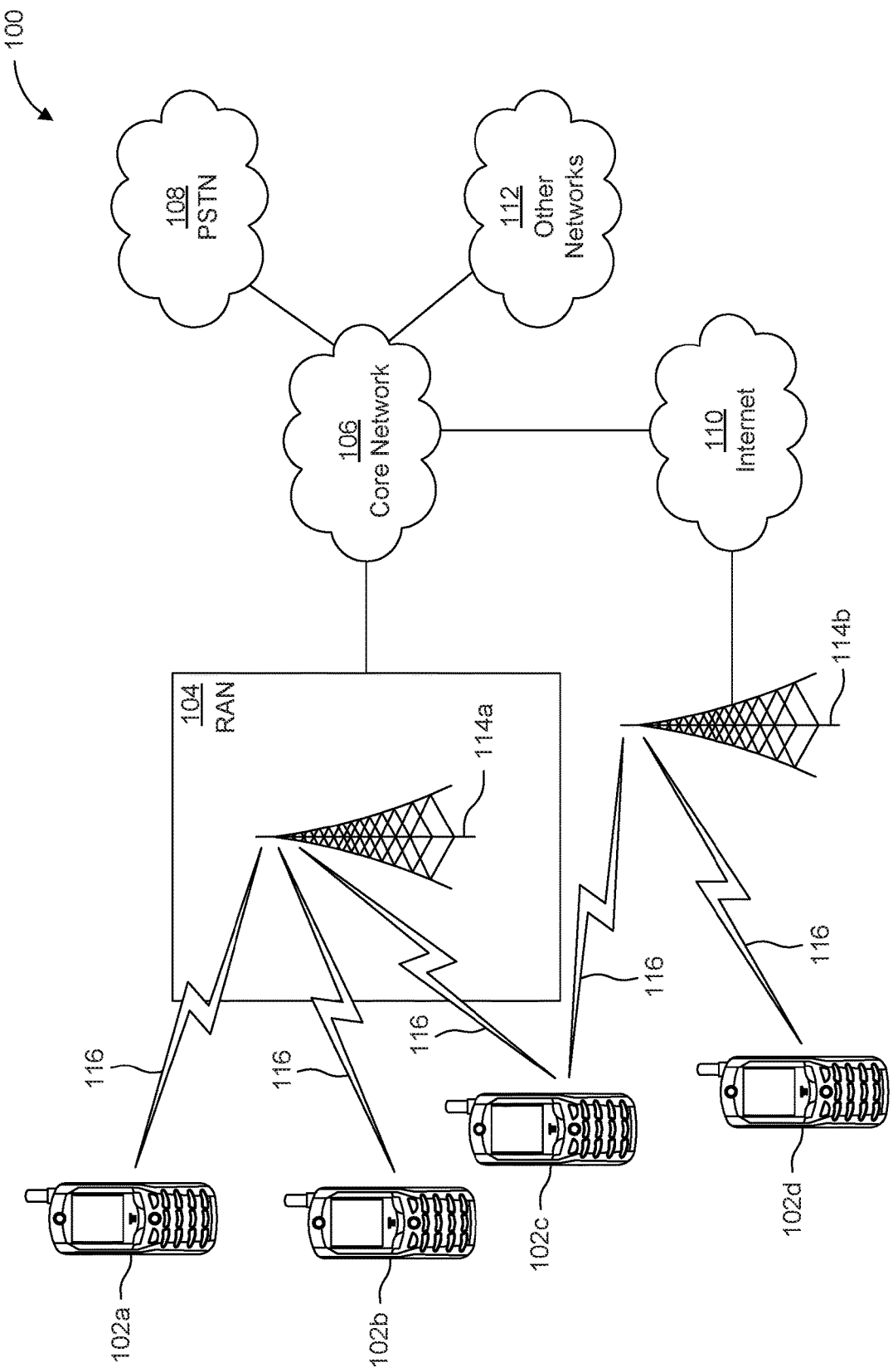
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
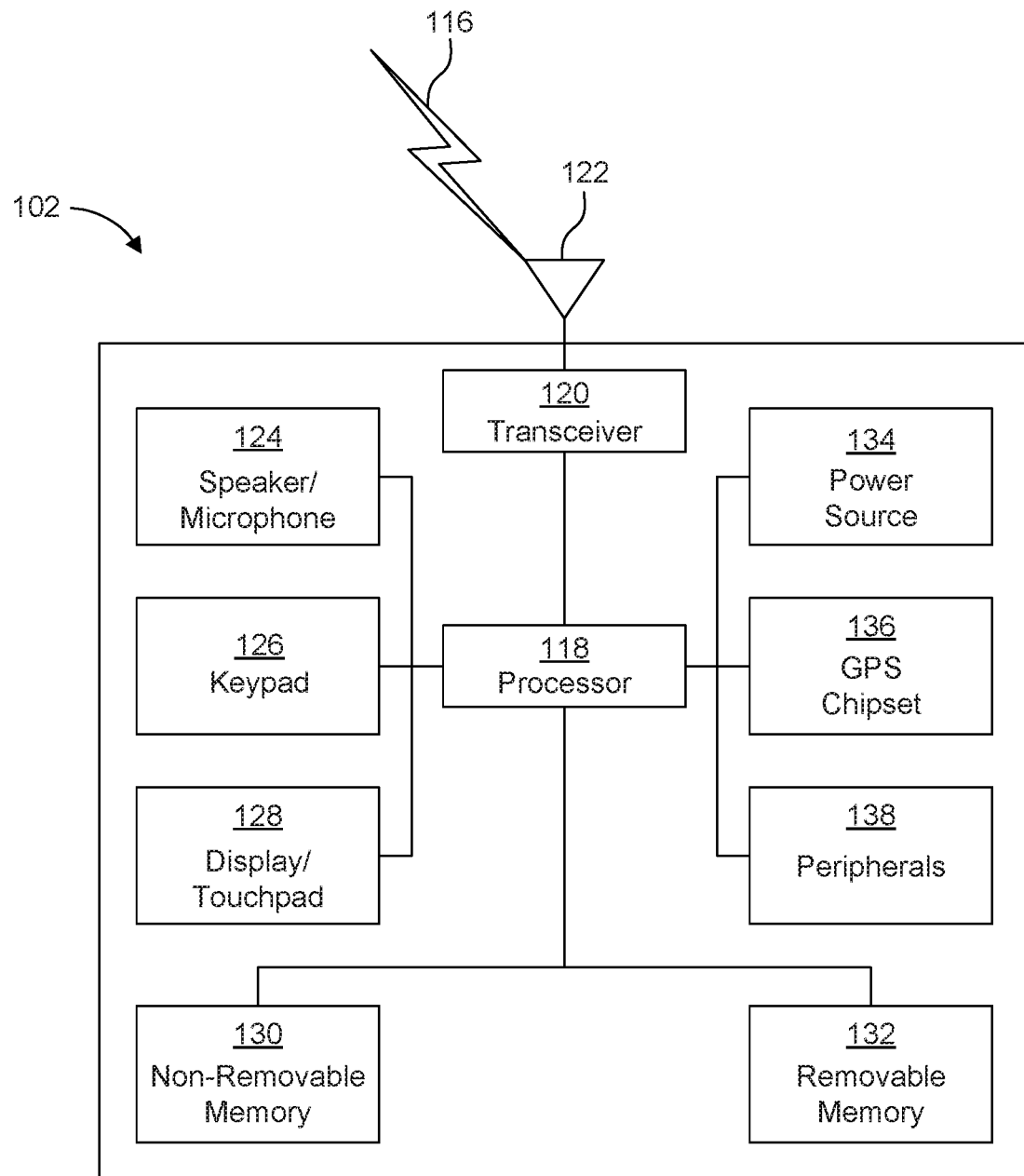
FIG. 1B is a system diagram illustrating an example wireless transmit/receive unit (WTRU) that may be used within the communications system illustrated in FIG. 1A according to an embodiment.
Figure 1C:
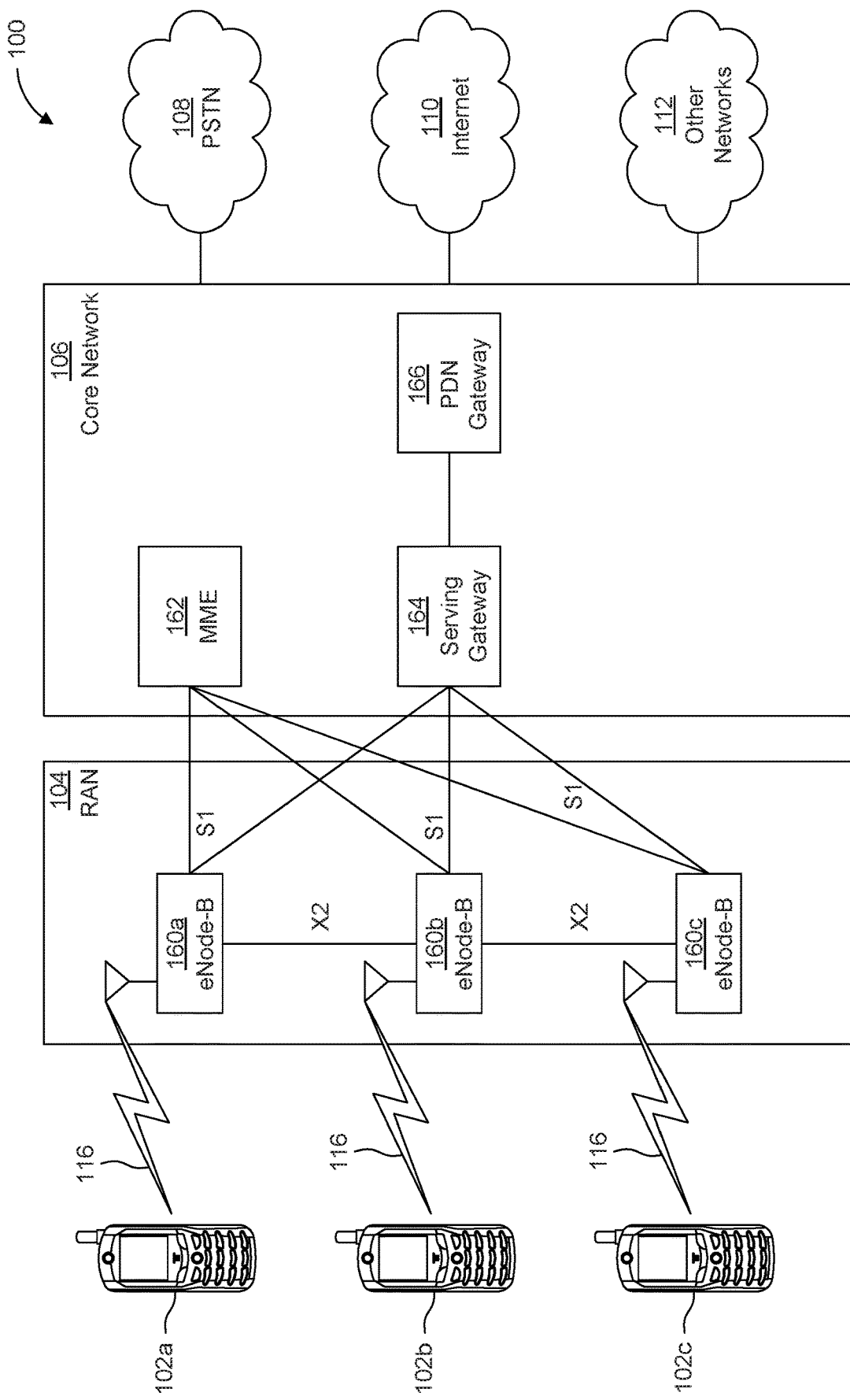
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
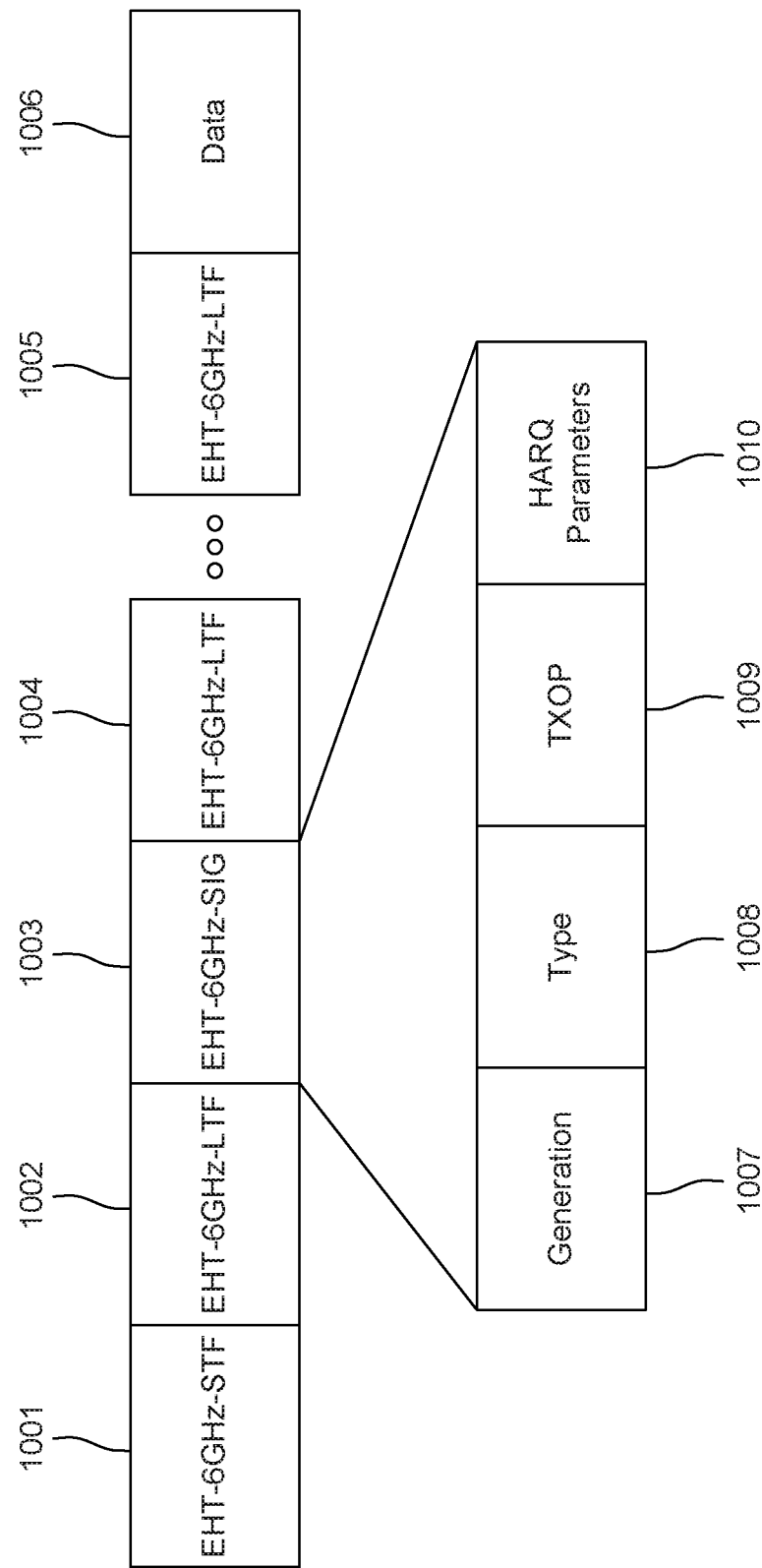
FIG. 10 is a diagram illustrating an extremely high throughput (EHT) 6 GHz PPDU format according to this application.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
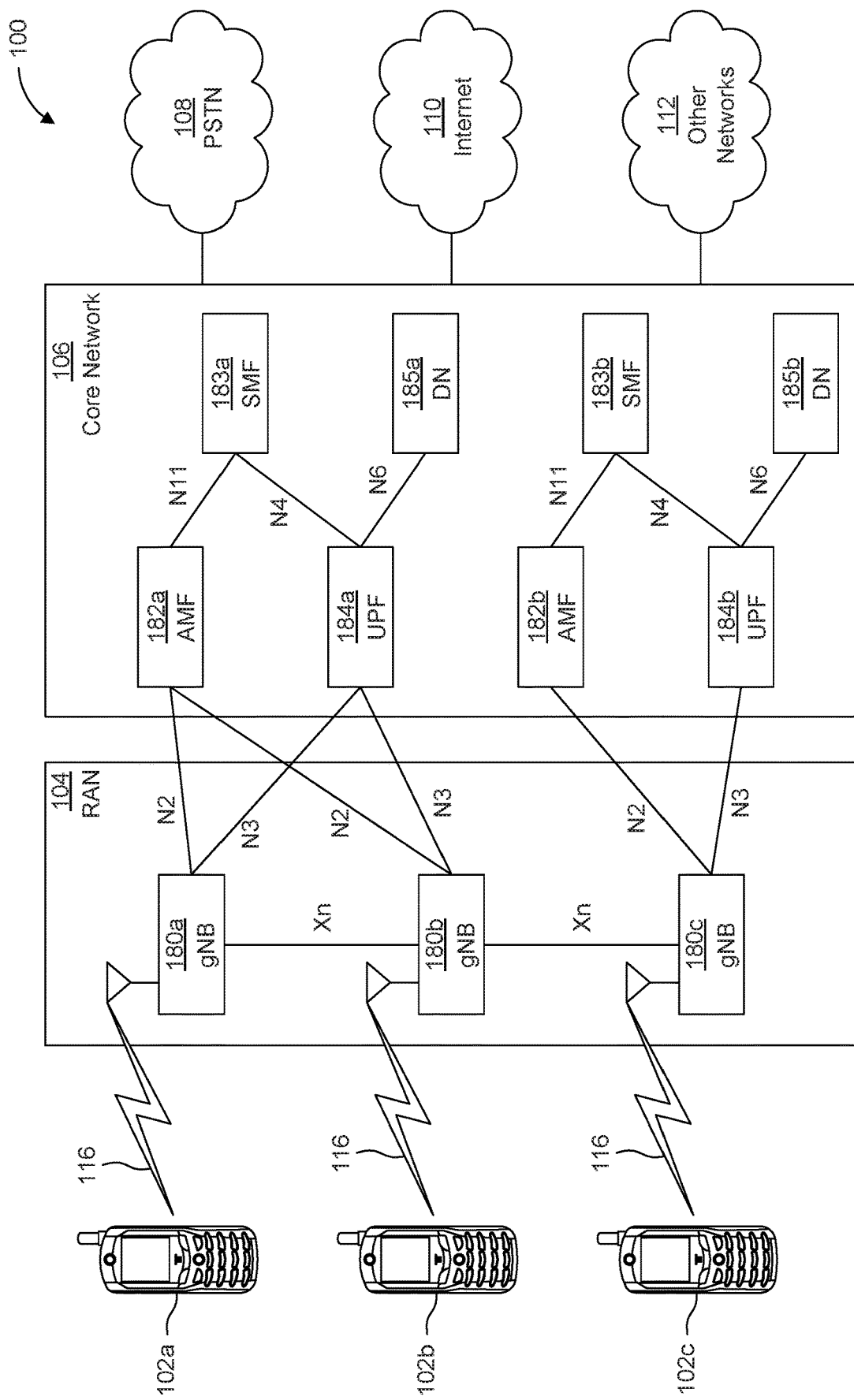
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WLAN in Infrastructure Basic Service Set (BSS) mode has an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is really peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode has no AP, and/or STAs, communicating directly with each other. This mode of communication is referred to as an "ad-hoc" mode of communication.

Using the 802.11ac infrastructure mode of operation, the AP may transmit a beacon on a fixed channel, usually the primary channel. This channel may be 20 MHz wide, and is the operating channel of the BSS. This channel is also used by the STAs to establish a connection with the AP. The fundamental channel access mechanism in an 802.11 system is Carrier Sense Multiple Access with Collision Avoidance (CSMA/CA). In this mode of operation, every STA, including the AP, will sense the primary channel. If the channel is detected to be busy, the STA backs off. Hence only one STA may transmit at any given time in a given BSS.

In 802.11n, High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels are formed by combining contiguous 20 MHz channels similar to 802.11n described above. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, is passed through a segment parser that divides it into two streams. IFFT, and time domain, processing are done on each stream separately. The streams are then mapped on to the two channels, and the data is transmitted. At the receiver, this mechanism is reversed, and the combined data is sent to the MAC.

Sub 1 GHz modes of operation are supported by 802.11af, and 802.11ah. For these specifications the channel operating bandwidths, and carriers, are reduced relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for Meter Type Control (MTC) devices in a macro coverage area. MTC devices may have limited capabilities including only support for limited bandwidths, but also include a requirement for a very long battery life.

WLAN systems which support multiple channels, and channel widths, such as 802.11n, 802.11ac, 802.11af, and 802.11ah, include a channel which is designated as the primary channel. The primary channel may, but not necessarily, have a bandwidth equal to the largest common operating bandwidth supported by all STAs in the BSS. The bandwidth of the primary channel is therefore limited by the STA, of all STAs in operating in a BSS, which supports the smallest bandwidth operating mode. In the example of 802.11ah, the primary channel may be 1 MHz wide if there are STAs (e.g., MTC type devices) that only support a 1 MHz mode even if the AP, and other STAs in the BSS, may support a 2 MHz, 4 MHz, 8 MHz, 16 MHz, or other channel bandwidth operating modes. All carrier sensing, and NAV settings, depend on the status of the primary channel; i.e., if the primary channel is busy, for example, due to a STA supporting only a 1 MHz operating mode is transmitting to the AP, then the entire available frequency bands are considered busy even though majority of it stays idle and available.

In the United States, the available frequency bands which may be used by 802.11ah are from 902 MHz to 928 MHz. In Korea it is from 917.5 MHz to 923.5 MHz; and in Japan, it is from 916.5 MHz to 927.5 MHz. The total bandwidth available for 802.11ah is 6 MHz to 26 MHz depending on the country code.

The IEEE 802.11™ High Efficiency WLAN (HEW) may enhance the quality of service all users experience for a broad spectrum of wireless users in many usage scenarios including high-density scenarios in the 2.4 GHz, 5 GHz and 6 GHz band. New use cases which support dense deployments of APs, and STAs, and associated Radio Resource Management (RRM) technologies are being considered by the HEW.

Potential applications for HEW may include emerging usage scenarios such as data delivery for stadium events, high user density scenarios such as train stations, or enterprise/retail environments, and also evidence for an increased dependence on video delivery, and wireless services for medical applications.

In the IEEE 802.11ax several embodiments showed that the measured traffic for a variety of applications has a large likelihood for short packets, and there are network applications that may also generate short packets. The applications include the following: Virtual office, TPC ACK, Video streaming ACK, Device/Controller (Mice, keyboards, Game controls, etc.), Access—Probe request/response, Network selection—probe requests, ANQP, Network management—Control frames.

Also, many embodiments in 802.11ax have described the introduction of MU features that include UL and DL OFDMA and UL and DL MU-MIMO. Designing and defining a mechanism for multiplexing UL random access for different purposes may be consider in this disclosure.

In the IEEE 802.11ax, medium access in the 6 GHz band may include several embodiments. One embodiment may use triggered or scheduled medium access in the 6 GHz band. Another embodiment may use restrict active scanning and have scheduled EDCA medium access in the 6 GHz band.

Hybrid Automatic Repeat reQuest (HARQ) has become an essential transmission error control technique in wireless communication networks, which relies on a combination of error correction codes and retransmissions. HARQ has been adopted in wireless communications standards such as 3GPP UMTS, LTE and IEEE 802.16 WiMax.

There are two popular types of HARQ combining schemes in the technical literature: Chase Combining (CC) HARQ and Incremental Redundancy (IR) HARQ.

In the Chase Combining HARQ scheme, each retransmission includes the same data and parity bits. Receiver uses Maximum Ratio Combining (MRC) to combine the received packet with previous transmission. Chase Combining can be regarded as repetition coding, in which each retransmission increases the Eb/N0 at the receiver.

For the Incremental Redundancy HARQ scheme, each retransmission uses a different set of coded bits (e.g., different redundancy versions generated by puncturing the encoder output). For turbo code, this means different systematic and parity bits. At each retransmission, the receiver gains extra information. There are variants of IR HARQ: Retransmission includes parity bits or it is self-decodable.

In general, HARQ schemes can be categorized as either synchronous or asynchronous, with the retransmissions in each case being either adaptive or non-adaptive. For synchronous HARQ, retransmission for each process occurs at predefined times relative to the initial transmission. Hence, there is no need to signal HARQ process ID, which can be inferred from retransmission timing. On the other hand, for asynchronous HARQ, retransmissions can occur at any time relative to the initial transmission. Hence, explicit signaling is required to indicate HARQ process ID to ensure that the receiver can correctly associate each retransmission with the corresponding previous transmission.

In LTE, the HARQ entity is located in the MAC layer, which is responsible for the transmit and receive HARQ operations. The transmit HARQ operation includes transmission and retransmission of transport blocks, and reception and processing of ACK/NACK signaling. The receive HARQ operation includes reception of transport blocks, combining of the received data and generation of ACK/NACK signaling based on decoding results. In order to enable continuous transmission while previous transport blocks are being decoded, up to eight HARQ processes in parallel are used to support multi-process 'Stop-And-Wait' (SAW) HARQ operation. Therefore, multi-process HARQ interlaces several independent SAW processes in time so that all the transmission resources can be used by one of the processes. Each HARQ process is responsible for a separate SAW operation and manages a separate buffer.

In LTE standards, asynchronous adaptive HARQ is used in the downlink and synchronous (could be either adaptive or non-adaptive) HARQ is used in the uplink.

In LTE, the following signaling may be used to support HARQ: HARQ process ID (for asynchronous HARQ only), New Data Indicator (NDI) (toggled whenever a new packet transmission begins), Redundancy Version (RV) (RV of the transmission block (for adaptive HARQ only)), and/or MCS (for adaptive HARQ only).

In 3GPP NR, following HARQ features may be supported: Multiple HARQ processes, Dynamic and semi-static HARQ ACK codebook, CBG level HARQ retransmission, Asynchronous and adaptive HARQ, Flexible timing between data transmission and HARQ ACK feedback.

In 3GPP NR, codeword block group (CBG) level HARQ retransmission is supported. A transmit block (TB) may include one or more CBGs, which may have their own HARQ ACK bits. Thus it is possible for the transmitter to retransmit partial TB. Two CBG related signalling fields, CBG transmission information (CBGTI) and CBG flushing out information (CBGFI), are carried by DCI. CBGTI indicates the CBG(s) the (re)transmission carries. CBGFI set to 0' indicates that the earlier received instances of the same CBGs being transmitted may be corrupted, and CBGFI set to 1' indicates that the CBGs being retransmitted are combinable with the earlier received instances of the same CBGs.

In 3GPP NR unlicensed (NR-U), HARQ feedback can be transmitted on unlicensed band. NR-U may consider mechanisms to support flexible triggering and multiplexing of HARQ feedback for one or more DL HARQ processes. Following techniques are identified as beneficial for NR-U transmissions: (1) Techniques to handle reduced HARQ A/N transmission opportunities for a given HARQ process due to LBT failure; and (2) Transmission of HARQ A/N for the corresponding data in the same shared channel occupation time (COT). For the first technique, potential techniques may include mechanisms to provide multiple and/or supplemental time and/or frequency domain transmission opportunities. For the second technique, it is understood in some cases, the HARQ Ack/Nack may need to be transmitted in a separate COT from the one the corresponding data was transmitted. Mechanisms to support this need to be identified.

The IEEE 802.11 Extremely High Throughput (EHT) may be the next major revision to IEEE 802.11 standards following 802.11ax. EHT is formed to explore the possibility to further increase peak throughput and improve efficiency of the IEEE 802.11 networks. The primary use cases and applications addressed may include high throughput and low latency applications such as: Video-over-WLAN, Augmented Reality (AR), and Virtual Reality (VR).

A list of features in the EHT to achieve the target of increased peak throughput and improved efficiency may include, but are not limited to: Multi-AP, Multi-Band, z bandwidth, 16 partial Streams, HARQ, Full Duplex (in time and frequency domain), AP Coordination, Semi-Orthogonal Multiple Access (SOMA), and New designs for 6 GHz channel access.

Collision Aware HARQ for EHT is described herein.

Figure 2:
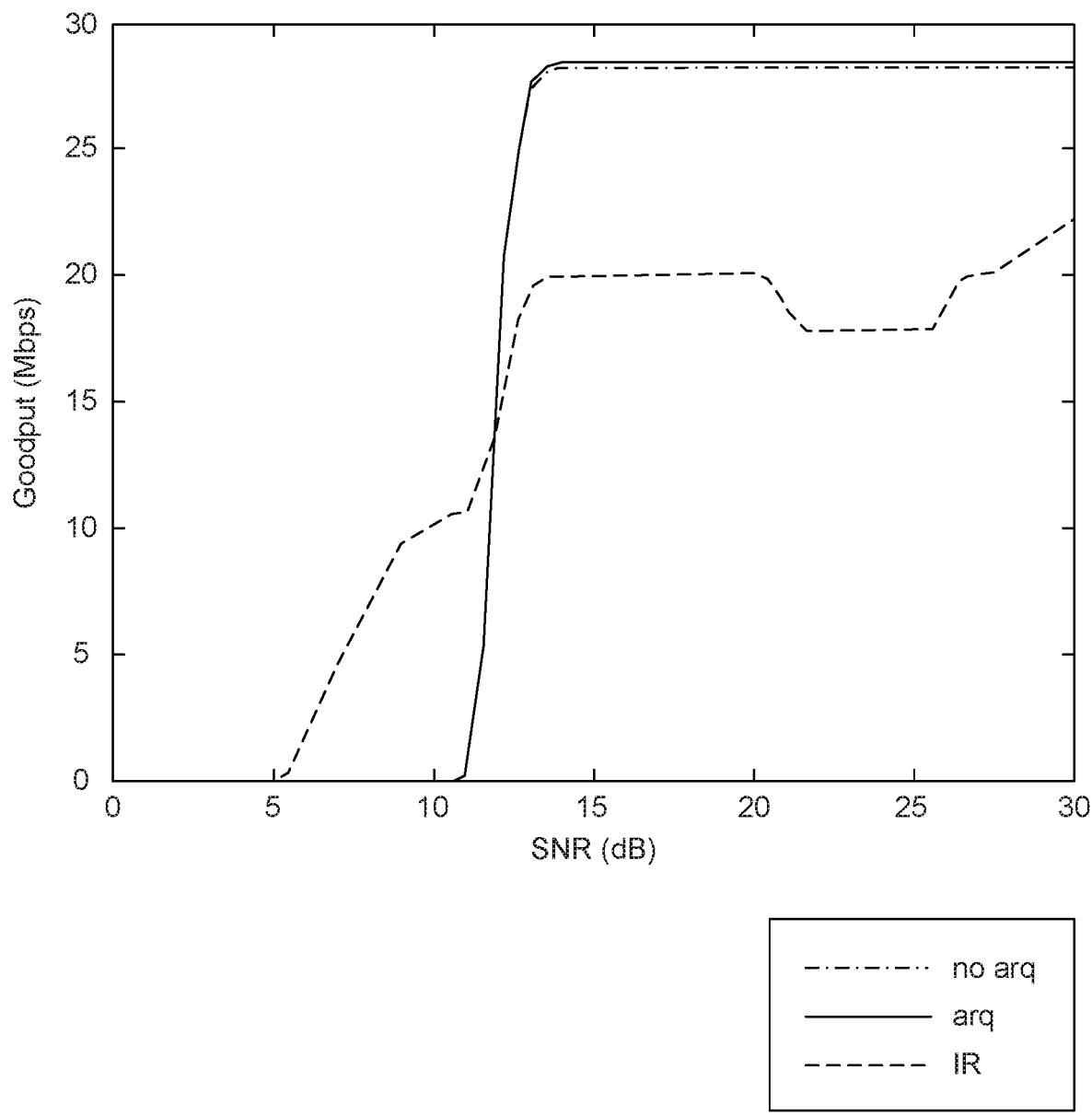
FIG. 2 is a diagram illustrating an example hybrid automatic repeat request (HARQ) goodput performance with collisions.

FIG. 2 illustrates an example hybrid automatic repeat request (HARQ) goodput performance with collisions. In unlicensed channels, the noise model may be collision-dominated, with interference from other 802.11 transmitters as well as other Radio Access Technologies (e.g., 3GPP NR-Unlicensed). For transmissions that fail due to the addition of interference, which is most likely non-Gaussian, utilizing these transmissions for HARQ combining may result in worse performance than simple ARQ.

As illustrated in FIG. 2, use of incremental redundancy (IR) HARQ in the presence of collisions results in a drop in performance at higher SNRs. Embodiments not to drop the performance may include limiting HARQ to non-collision environments, for example, trigger based transmission or multi-AP deployment or using modified receivers that incorporate the presence of collisions.

Figure 3:
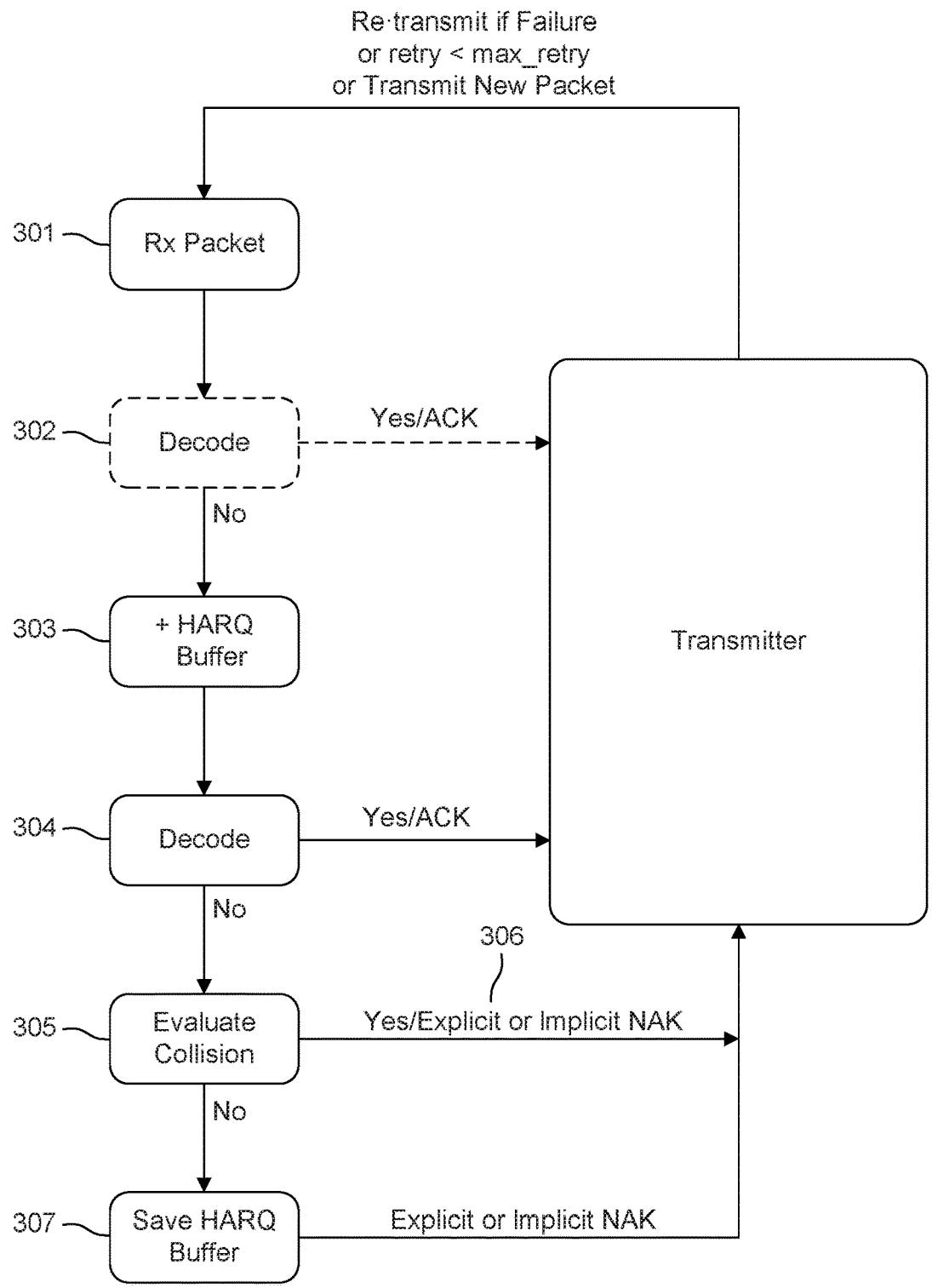
FIG. 3 is a diagram illustrating an example of a collision aware HARQ receiver.
Figure 4:
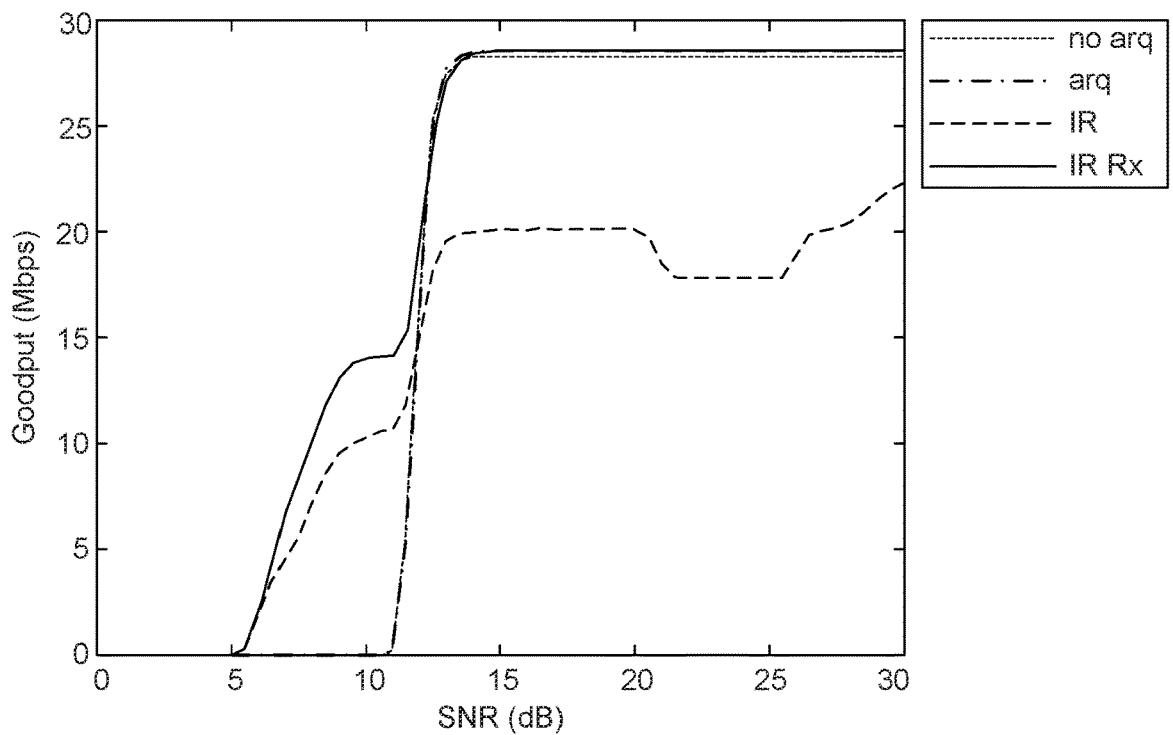
FIG. 4 is a diagram illustrating an example performance of the collision aware HARQ receiver illustrated in FIG. 3.

FIG. 3 illustrates an example of a collision aware HARQ receiver. As shown in FIG. 3, a collision-aware HARQ receiver can be used with the following procedure: (1) receive a Rx packet at 301; (2) decode the Rx packet at 302; (2) if failure, add HARQ buffer at 303 and then decode at 304; (3) if failure, find if there is collision at 305; and (4) If there is collision, then discard 306; if there is no collision, then add to buffer at 307. FIG. 4 illustrates an example performance of the collision aware HARQ receiver illustrated in FIG. 3. This results in an improvement in the performance as seen in IR Rx but assume an ideal collision estimator.

The IEEE 802.11ax has recently expanded its scope to include the operations of 802.11ax devices in the 6 GHz band, which is expected to be open for unlicensed usage. Since there are no legacy WLAN devices operating on the 6 GHz band, the backwards compatibility requirements are expected to be less stringent. There is need for HARQ medium access and scheduling, as well as HARQ transmission protocols for the 6 GHz band given the potential new medium access paradigm.

One of the features that the HARQ technology may provide is range extension. In order to provide range extension, HARQ transmissions may need to go beyond the lowest MCS currently used in the WLAN. However, any HARQ transmissions need to rely on the current WLAN signaling and waveform design, which is still subject to the lowest MCS that is associated with the current longest range. In order to provide extended range, HARQ transmission protocols and additional signaling designs that enable HARQ transmissions over a longer range are needed.

Collision-aware HARQ schemes may require that the receiver or transmitter knows that there was a collision and is able to modify its behavior. A sudden power level change, for example, in received signal strength indicator/received channel power indicator (RSSI/RCPI), during the reception process may indicate the occurrence of a collision but in fading channels, this may be an unreliable method. As such, signalling, feedback and procedures that enable the EHT transmitter and receiver to reliably indicate the occurrence of collisions are needed.

Embodiments for HARQ Scheduling and Medium Access for the 6 GHz band are described herein.

Embodiments for WLAN Medium Access in 6 GHz band and/or Time Division Duplex (TDD) Medium Access system are described herein.

Beacon interval may have fixed format or pre-configured/pre-defined format, so that any STA which may miss Beacon frame may have a chance to find timing information and be able to communicate with the AP.

Embodiments to make STAs capable to communicate with the AP when it may miss a Beacon frame (e.g., a STA may switch to the AP or the band in the middle of the beacon interval) may include: (1) fixed beacon interval format: fixed beacon frame size, fixed TDD interval size; (2) TDD ID in each TDD interval; (3) special sequence at the beginning of each TDD interval or longer preamble in the first transmission of a TDD; and (4) TDD identity in each TDD interval to indicate what TDD it may be.

Figure 5:
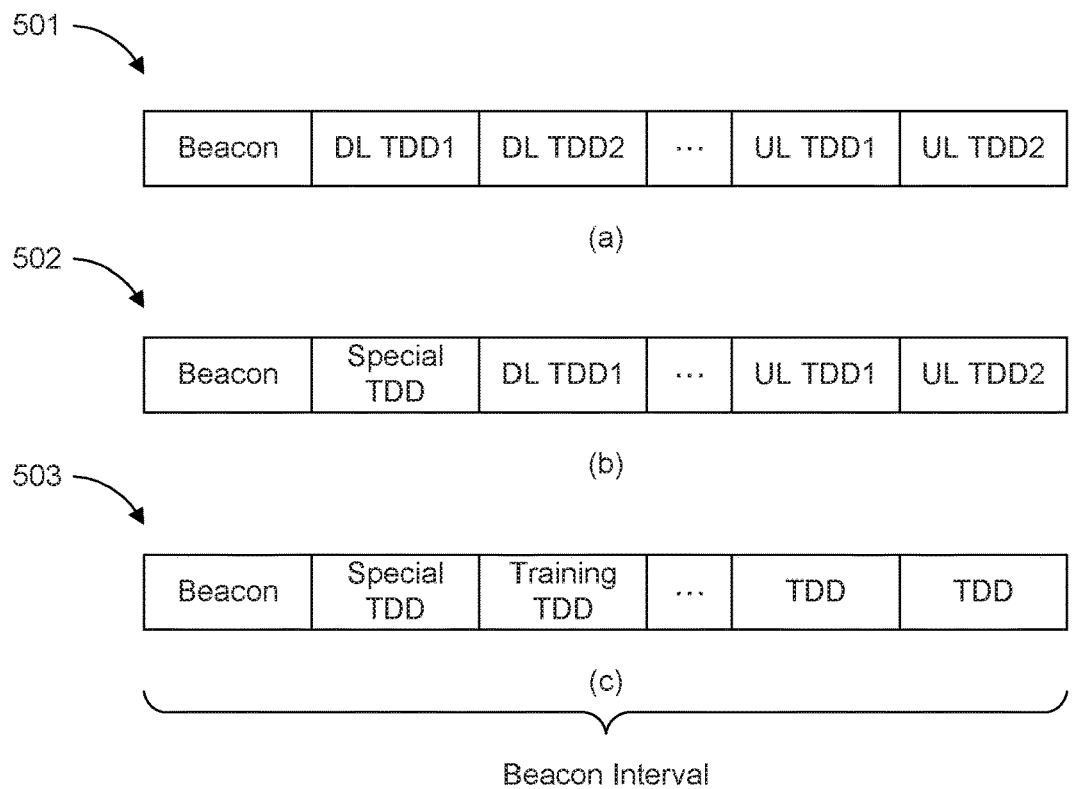
FIG. 5 is a diagram illustrating exemplary beacon intervals with time division duplex (TDD) intervals.

FIG. 5 illustrates three exemplary beacon intervals with Time Division Duplex (TDD) intervals. In one example, a beacon interval may be made of TDD intervals as illustrated in FIG. 5. Beacon interval 501 is a first example of the beacon interval with TDD intervals. Beacon intervals 502 and 503 are the other two examples of the beacon interval with TDD intervals.

The TDD intervals may have the fixed size. Each TDD interval may be used to transmit one or more frames from one or more STAs. For example, a DL TDD may be initiated by an AP. Once AP may acquire the channel through EDMA/CA and then share it with one or more STAs. The STAs may transmit in the interval with limited channel sensing. The DL TDD interval may be used for multiple DL/UL frame exchanges.

Different TDD intervals may be defined and different TDD intervals may have different transmission/medium assess rules. Examples of TDD intervals may include, but are not limited to, beacon TDD interval, DL TDD interval, UL TDD interval, and special TDD interval.

Beacon TDD interval may located at the beginning of a Beacon interval. Beacon TDD interval may be used to transmit beacon frame or beacon frames. In one example, the beacon TDD interval may present once in a beacon interval. In another example, the beacon TDD interval may be optionally present in a beacon interval, so that the transmission of beacon frame may be skipped. The beacon TDD interval size may be predefined with fixed duration. In one example, the beacon TDD interval size may be configurable. For example, type 1 to N beacon TDD interval may be predefined with N sizes. Type 1 beacon TDD interval may be able to carry full beacon frame with all the management elements. Type 2 beacon TDD interval may be able to carry beacon frames with majority information of the elements. Type N beacon TDD interval may carry beacon frames with basic information and the shortest size. The beacon TDD interval type may be signalled in advance through previous beacon frame or in other band. If a beacon frame transmission may exceed the boundary of beacon TDD interval, the beacon frame may be truncated and the truncated part may be transmitted during a later beacon interval. If a beacon frame transmission may be shorter than the Beacon TDD interval, the AP may have several choices which may be preconfigured or signalled by the AP in the beacon frame: (1) the AP may allow other STAs to transmit in the rest of the Beacon TDD interval using EDMA/CA; (2) the AP may not allow other STAs to transmit in the rest of the Beacon TDD interval. The AP may transmit special control/management signals or training/sounding signals. The AP may not allow other STAs to transmit; or (3) the AP may not transmit either and in that case, the medium may not be used by the STAs in the BSS so that the period may be used to measure inter-BSS interference.

DL TDD interval may be used to exchange data/control/management information between an AP and STAs. The DL TDD interval may be initiated by an AP, once AP may acquire the channel through EDMA/CA and then share it with one or more STAs. The STAs may transmit in the interval with limited channel sensing or even no sensing. In one example, all the DL TDD intervals in a beacon interval may have the same fixed sizes. The size may be predefined or preconfigured. If it is configured, the DL TDD interval size may be carried in the beacon frame, and/or other control/management frames transmitted in band or out of band.

UL TDD interval may be used to exchange data/control/management information between an AP and STAs. In one example, all the UL TDD intervals in a beacon interval may have the same fixed sizes. The size may be predefined or preconfigured. If it is configured, the UL TDD interval size may be carried in the beacon frame, and/or other control/management frames transmitted in band or out of band. A STA which may have uplink traffic to transmit may closely monitor the UL TDD interval. The channel access procedure of UL TDD interval may follow one or more examples below:

First, the UL TDD interval may be initiated by an AP, once AP may acquire the channel through EDMA/CA or scheduling and it may transmit a Trigger frame to trigger concurrent UL transmissions. The Trigger frame may be used to trigger dedicated STAs or random STAs. The AP may share it with one or more STAs. The STAs may transmit in the interval with limited channel sensing or even no sensing.

Second, the UL TDD interval may be initiated by a STA. Once the STA may acquire the channel through EDMA/CA or scheduling, it may transmit uplink frame to the AP. The AP may share the TDD and transmit to the STA and other STAs.

Special TDD interval may have specific format and for specific use. Examples of special TDD interval may include, but are not limited to, Target Wake Time (TWT) TDD, Restricted Access Window (RAW), Power saving TDD, and Training TDD.

For the TWT TDD, the interval may use conventional TWT transmission procedures.

For the RAW TDD, the interval may use conventional RAW transmission procedures.

For the power saving TDD, the interval may be used to wake up STAs in power saving mode.

For the training TDD, the interval may be used for one to one or one to multiple sounding, beamforming training.

FIG. 5 shows several examples of the proposed beacon intervals with TDD system.

At the end of a TDD interval, transmission may have to be truncated so that it may not pass the TDD boundary. If the transmissions are completed before the end the TDD: (1) the AP may allow other STAs to transmit using EDMA/CA; (2) the AP may not allow other STAs to transmit and may transmit special control/management signals or training/sounding signals; or (3) the AP may not allow other STAs to transmit and may not transmit either. In this third case, the medium may not be used by the STAs in the BSS so that the period may be used to measure inter-BSS interference.

Embodiments for TDD Index and Identity and Sequence are described herein.

Figure 6:
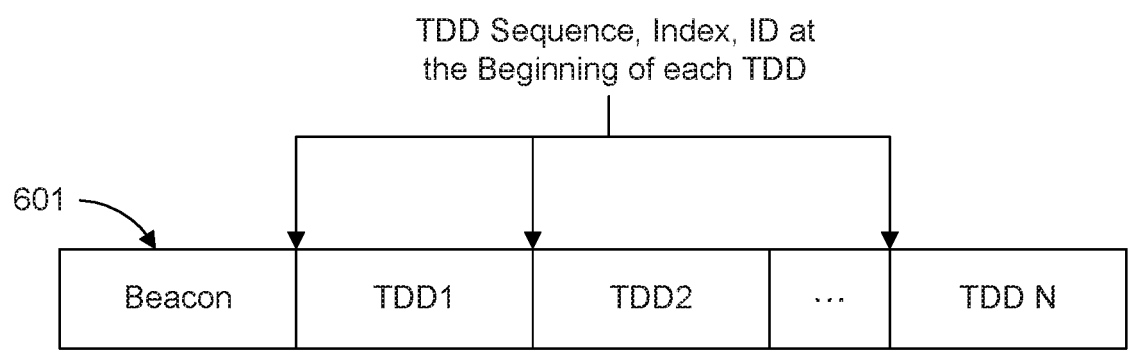
FIG. 6 is a diagram illustrating an example detailed TDD interval structure.

FIG. 6 illustrates an example detailed TDD interval structure. In one example, each TDD may carry a TDD index and/or TDD identity and/or sequence as illustrated in FIG. 6. As shown in FIG. 6, the beacon interval may comprise beacon 601 and multiple TDD (i.e., TDD 1, TDD2, . . . , TDD N).

The TDD index may be used by a STA to determine the timing information and when next Beacon may be expected. In one example, TDD index may be explicitly carried. For example TDD index may be carried in Physical Layer Convergence Protocol (PLCP) header or MAC header. TDD index may be explicitly carried in the first transmission in the TDD interval or every frame in the TDD interval. In one example, the number of TDDs in a beacon interval may be a fixed number so that a STA may know the expected time for the next beacon frame. In one example, the TDD index may be transmitted in a countdown way, so that the index may indicate the number of left TDDs in the Beacon interval.

The TDD identity may be used to indicate what kind of TDD it may be since different TDD may have different channel access procedure and TDD format. For example, the TDD identity may indicate whether the TDD is a DL TDD, UL TDD, special TDD (and which special TDD), or the like.

A TDD sequence may be transmitted at the beginning of each TDD interval. A STA may look for the TDD sequence to detect the start of the TDD.

A TDD schedule element may be defined and carried in the Beacon frame. The TDD schedule element may indicate: beacon interval duration, number of TDDs in the beacon interval, TDD identities or TDD specific information. The beacon interval duration may indicate the duration of current beacon interval. The duration may be predefined or preconfigured. The TDD identities or TDD specific information field may be used to indicate the TDD identities for each TDD. In one example, the TDD schedule element may be used to schedule the TDD interval structure for one or more beacon intervals. In another example, the number of effective beacon intervals may be indicated. The number of effective beacon intervals may indicate the same TDD interval format may be valid for these number of beacon intervals.

Embodiments for out of band scheduling are described herein.

An AP, or a collocated AP, may be able to operate on multiple bands. AP in band 1 may configure the transmission of AP in band 2. For example, band 1 may be 5 GHz band where conventional EDMA/CA channel access procedure may be applied, while band 2 may be 6 GHz band where limited EDMA/CA may be applied. For example, only AP may need to perform EDMA/CA for channel access, and the transmission from STAs may be more schedule based.

In one example, Band 1 may include information to help STAs to associate or reassociate with an AP in Band 2. For example, TDD schedule element may be carried and transmit in Band 1. Medium access over Band 2 may be different from that in Band 1. Thus, some medium access information may be carried in Band 1.

In one example, Band 1 may carry some management and control signaling for Band 2. Transmission on Band 2 may carry less management and control signal so that it may carry more data transmission. For example, Band 2 may carry limited Beacons (i.e., the Beacon may carry less information than traditional one). Beacon interval may be larger than conventional WiFi system.

Embodiments for HARQ scheduling are described herein.

HARQ transmission across multiple TDD intervals may be possible. Moreover, a transmission may be at the end of a TDD interval, such that the acknowledgement may be able to transmit in the same interval.

Figure 7:
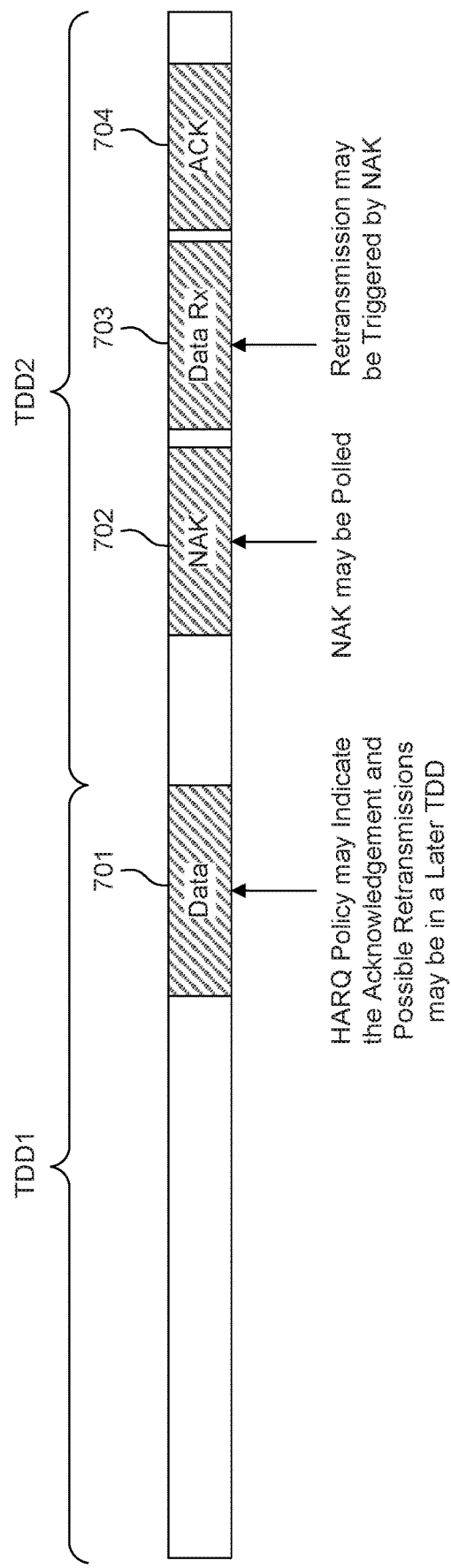
FIG. 7 is a diagram illustrating an example procedure for HARQ over the TDD boundary.

FIG. 7 illustrates an example procedure for HARQ over the TDD boundary. A STA (STA1) may transmit a frame at the end of a TDD interval to a STA (STA2). In one example STA 2 may be an AP and the transmission may be a trigger based uplink transmission. The STA may not expect it may receive acknowledgement back in the same TDD. The STA may set HARQ policy (as indicated by Data 701) to indicate the acknowledgement and possible retransmissions may be in a later TDD (i.e., TDD 2). The HARQ policy may be carried in MAC header. As shown in FIG. 7, NAK 702 may be polled, and Data Rx 703 may indicate that retransmission may be triggered by NAK. ACK 704 may indicate the Data 701 in TDD 1 has been successfully received. Alternatively or additionally, the above HARQ policy may be carried in PLOP header. Both STA1 and STA2 may hold the transmitted/received packet in HARQ buffer.

STA2 may have chance to transmit in a future TDD, for example TDD 2. STA2 may transmit a BA request frame to STA1.

Depending on the reception result, STA1 may transmit positive or negative acknowledgement (ACK or NAK) to STA2. In the case of NAK, the HARQ policy may indicate whether the retransmission may be triggered immediately after the acknowledgement or delay or in a future TDD.

STA2 may follow the instruction.

Embodiments for HARQ range extension are described herein. Embodiments for extended range beacon and waveform are also described herein.

Embodiments for HARQ range extension after association will be described as follows.

As discussed above, HARQ technology may be used in a WLAN scenario to provide a range extension. However, under the currently known WLAN signaling and waveform design, a range of a HARQ transmission is limited. In order to provide extended range, the present application discloses methods and WTRUs using new HARQ transmission protocols and signaling designs that may enable HARQ transmissions over a longer range. The methods and WTRUs according to this application will use low rate range extension (LRRE) HARQ PPDUs for transmissions between WTRUs and APs in a LRRE HARQ scheme. In this application, unless indicated otherwise, the terms "LRRE HARQ scheme", "LRRE HARQ mode", "LRRE HARQ operation" may be used interchangeably. It should be noted that the LRRE HARQ scheme according to this application is used in a WLAN scenario, and thus the term "LRRE HARQ operation" may indicate either an operation of the WLAN (i.e., WLAN's connection) or an operation of the stations (e.g., WTRUs or APs). It should be noted that in this application, unless indicated otherwise, the terms "extended range", "range extension" and "LRRE" may be used interchangeably.

The methods and the WTRUs according to the present application may use LRRE HARQ scheme to provide a range extension. In the LRRE HARQ scheme, a WTRU may be supported even when it is beyond the range of supporting a MCS or even when its transmission rate is lower than a non-HARQ MCS. The methods, the WTRUs and the APs using LRRE HARQ scheme for providing an extended range for WLAN will be described below with reference to FIGS. 8A-8D.

Figure 8A:
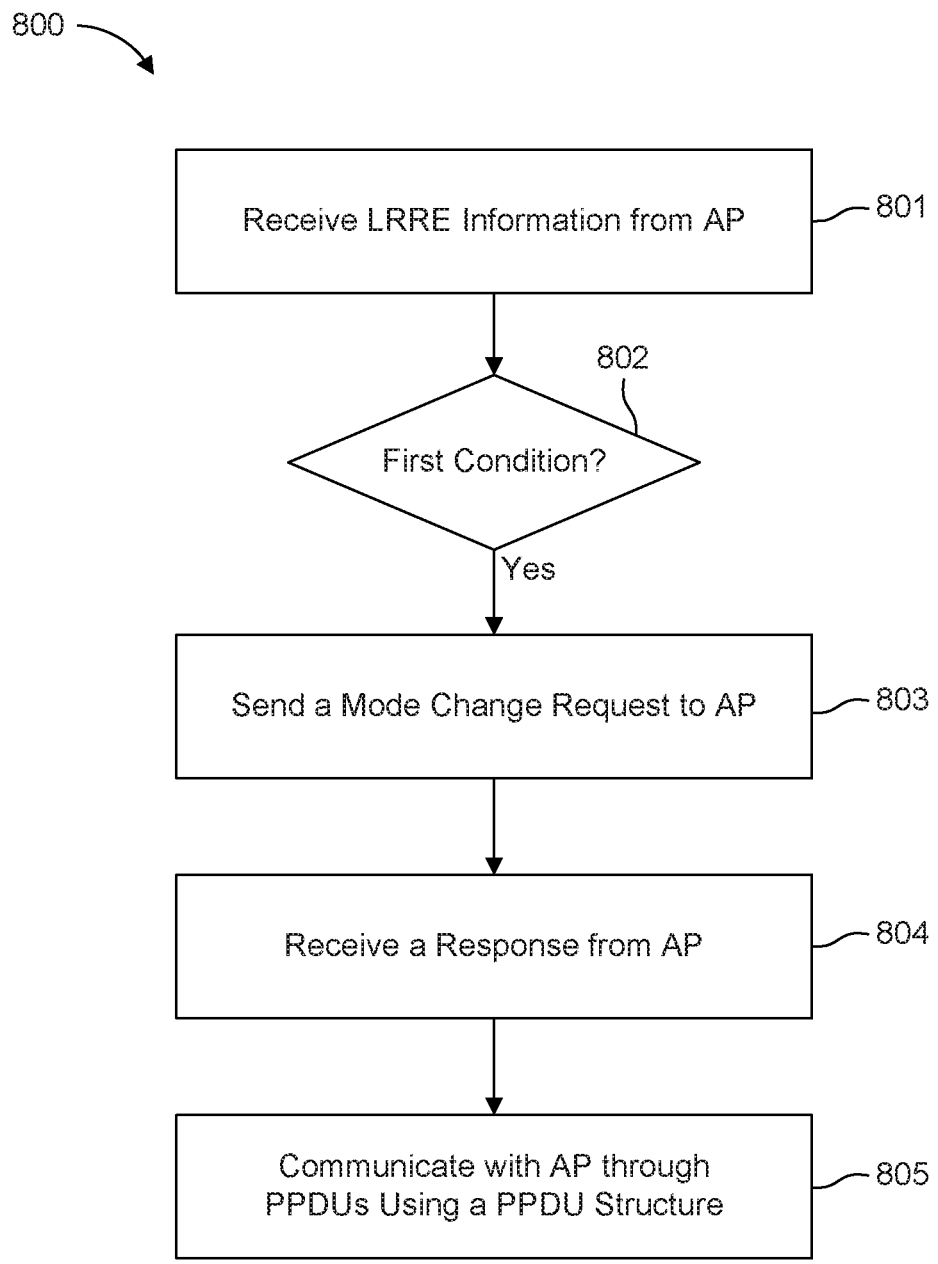
FIG. 8A is a diagram illustrating a method of providing range extension for WLAN according to a first embodiment of this application.

The first embodiment according to this application will be described with reference to FIG. 8A. FIG. 8A illustrates an exemplary flow chart of the method 800 according to the first embodiment of this application. It should be noted that the method 800 illustrated in FIG. 8A may be used by the WTRU according to this application.

As shown in FIG. 8A, the method 800 comprises: at 801, receiving LRRE information from an AP; at 802, determining whether a first condition is satisfied by the WTRU; on a condition that the first condition is satisfied, at 803, sending a mode change request to the AP to change an operation mode to a LRRE HARQ mode; at 804, receiving a response regarding the mode change request from the AP; at 805, communicating with the AP using a plurality of physical layer convergence procedure (PLOP) protocol data units (PPDUs) Each of the plurality of PPDUs may comprise: (1) at least one field enabling transmissions between WTRU and the AP under the first condition and/or (2) a LRRE HARQ mode indication.

Accordingly, the WTRU of providing range extension for WLAN according to this application may comprise: a receiver configured to receive LRRE information from an AP; a transmitter; and a processor configured to determine whether a first condition is satisfied by the WTRU, wherein on a condition that the first condition is satisfied, the transmitter is further configured to send a mode change request to the AP to change an operation mode to a LRRE HARQ mode; the receiver is further configured to receive a response regarding the mode change request from the AP; and the WTRU is configured to communicate with the AP using a plurality of PPDUs, and each of the PPDUs comprises (1) at least one field enabling transmissions between the WTRU and the AP under the first condition and (2) a LRRE HARQ mode indication.

Those processes in the method 800 and those components in the WTRU will be described in detail below with reference to specific embodiments.

As shown in FIG. 8A, the method 800 may comprise: at 801, receiving LRRE information from an AP. Accordingly, the receiver is configured to receive LRRE information from an AP.

In an embodiment, the LRRE information may comprise LRRE capability information. The LRRE capability information may indicate the AP's capability to operate in a LRRE operation mode.

For example, the LRRE capability information may comprise a distance parameter indicating a distance range within which the AP can operate in the LRRE operation mode, i.e., a distance range within which the AP's signal can be received by a WTRU in the LRRE operation mode.

For another example, the LRRE capability information may comprise a rate parameter indicating a rate range within which the AP may operate in the LRRE operation mode, i.e., a rate range within which the AP's signal, in the LRRE operation mode, can be received by a WTRU located within a desired distance.

The LRRE information may also comprise LRRE support information. The LRRE support information may indicate under what circumstances the AP may support LRRE operation, i.e., under what circumstances the AP may communicate with a WTRU in a LRRE operation mode.

The LRRE information may also comprise HARQ capability information. For example, the LRRE information may comprise the AP's capability to transmit data information using HARQ scheme in the LRRE operation mode, i.e., the AP's capability of transmission using LRRE HARQ scheme.

It will be appreciated that the above examples are not intended to be exclusive or be limiting to the present application. The LRRE information received at 801 may also be other information as long as that information may help to realize the principle of the present application.

Preferably, before receiving the LRRE information from the AP, the method 800 may further comprise: associating the WTRU with the AP. Accordingly, the WTRU may associate with the AP before the receiver receives the LRRE information from the AP.

As discussed above, the method 800 may be used for providing an extended range after a WTRU's association with an AP. In an embodiment, the WTRU may associate with an AP using a series of request-response procedures including authentication and association. It should be appreciated that the association method used by the WTRUs and the methods according to this application may be any known or further developed association process. In other words, the WTRU may use any available method to associate with an AP as long as that method may help to realize the principle of the present application.

Preferably, the method 800 may also comprise that after associating the WTRU with the AP, exchanging the above-mentioned LRRE information between the WTRU and the AP. To be more specific, when the WTRU associates with an AP, it may exchange its capability with the AP about low rate extended range, and/or HARQ capabilities support. On the one hand, the WTRU may transmit its LRRE information and/or HARQ capability information to the AP, and on the other hand, the AP may also transmit its LRRE information to the WTRU. Therefore, both the WTRU and the AP know the LRRE information from each other, and thus, they may change their operation modes into a LRRE operation based on the LRRE information from each other under some circumstances, such as when a first condition (described below) is satisfied.

It will be appreciated that generally speaking, WTRUs (e.g., WTRU 102a shown in FIG. 1) and APs may be referred to as stations. For example, in a scenario of WLAN, a wireless access point (WAP) may be referred to as a station (i.e., AP station), and a laptop or a smartphone may also be referred to as a station (i.e., non-AP station). In this application, in order to make a clear description, AP station will be referred to as AP, and non-AP station will be referred to as WTRU.

Then, the method 800 may proceed to the process at 802. At 802, the method 800 may comprise: determining whether a first condition is satisfied by the WTRU. Accordingly, the processor may determine whether a first condition is satisfied by the WTRU.

In an embodiment, the first condition may be satisfied when a channel quality of a channel used by the WTRU is less than a channel quality value. In other words, the first condition is that a channel quality of a channel used by the WTRU is less than a channel quality value. In this application, in order to differentiate values for different conditions which may be used for the methods according to this application, the channel quality value may also be referred to as a second value.

The channel quality may be affected by many different factors, such as distance and interference. For example, generally, the longer the distance between the WTRU and the AP, the worse the channel quality will be. The more networks operating on the same channel, the more interferences each one will experience, causing frequent disconnections and packet loss on connected client devices. The channel quality may be defined by different parameters, such as packet loss rate, latency, jitter, signal strength, etc. For example, the channel quality may be defined by the packet loss rate. If the packet loss rate is increasing, then the channel quality is getting worse; if the packet loss rate is decreasing, then the channel quality is getting better.

Accordingly, the second value may be a value of one of the above-mentioned parameters. For example, if the channel quality is defined by the packet loss rate, then the second value may be 5%. If the channel quality is defined by the latency, then the second value may be 3 ms.

It should be appreciate that although some examples of the channel quality and the second value have been given above, they are not intended to be exclusive or be limiting to the present application. The channel quality and the first valve may be selectively determined or defined by other available ways according to the principle of this application.

In another embodiment, the first condition is satisfied when a current distance between the WTRU and the AP is greater than a distance value. In other words, the first condition is that a current distance between the WTRU and the AP is less than a distance value. In this application, in order to differentiate values for different conditions, the distance value may also be referred to as a first value.

Generally, the longer the distance between the WTRU and the AP, the more difficult for them to communicate with each other. The current distance may not be a constant value all the time because the WTRU may be moved by its user. Sometimes, the WTRU may be moving away from the AP, and the distance between the WTRU and the AP will keep increasing, causing signal strength from the AP keeps decreasing. If the distance becomes too large (for example, larger than a threshold distance value), signals from AP may be too weak to reach the WTRU. One of purposes of this application is to provide a range extension of connection (e.g., WLAN connection) between the WTRU and the AP so that although the WTRU is, to some extent, far away from the AP (e.g., the current distance is larger than the threshold distance value), they can still communicate with each other.

Preferably, the process at 802 may be performed by the WTRU at a regular time interval, such as 3 s. By performing the process at 802 at a regular time interval, the WTRU may detect a distance change in a timely manner so that the WTRU may start those processes (e.g., those processes following the process at 802) to maintain its communication with the AP once the current distance is larger than the threshold distance value.

The current distance may be detected by transmitting UL frame and/or DL frame between the WTRU and the AP, and determining a parameter within the frame indicating transmitting time and receiving time. It should be noted that the above mentioned distance detection methods are only described by way of examples, and they are not intended to be exclusive or be limiting to the present application. The method 800 and the WTRU according to this application may use any other available and suitable methods to detect the current distance between the WTRU and the AP as long as those methods may help to realize the principle of the present application.

The above description has described some examples of the first condition, and they are not intended to be exclusive or be limiting to the first condition which may be applied in present application. The first condition determined at 802 and by the WTRU may also be any other conditions as long as they may help to realize the principle of this application.

Then, the method 800 may proceed to the process at 803. At 803, the method 800 may comprise: sending a mode change request to the AP to change an operation mode to a LRRE HARQ mode. Accordingly, the transmitter may send a mode change request to the AP to change an operation mode to a LRRE HARQ mode.

In an embodiment, an operation mode may represent a current operation mode of the WLAN. In another embodiment, an operation mode may represent a current operation mode of the AP or a current operation mode of the WTRU. For example, before a station (e.g., the WTRU or the AP) switches to the LRRE HARQ mode, it may be operating in an infrastructure operation mode (e.g., the WTRU connects to the AP via a wireless link) or a default mode (e.g., the WTRU communicates with the AP using a non-LRRE HARQ mode). It should be appreciated that the above examples of the current operation mode are not intended to be limiting to those current operation modes in which the WLAN, the WTRU and/or the AP may be operating. Any other available and suitable operation mode may be the current operation mode as long as they may help to realize the principle of this application.

The LRRE HARQ mode may represent that a station (e.g., the WTRU) is using LRRE HARQ scheme to communicate with another station (e.g., the AP). Accordingly, in the LRRE HARQ mode, the WTRU may, by using the LRRE HARQ scheme, transmit and receive PPDUs (e.g., LRRE HARQ PPDUs). Accordingly, the AP may, by using the LRRE HARQ scheme, transmit and receive PPDUs (e.g., LRRE HARQ PPDUs). In this application, unless otherwise indicated, the terms "LRRE HARQ mode", "HARQ mode", "LRRE HARQ scheme" and "LRRE operation mode" may be used interchangeably. The following description will further illustrate the LRRE HARQ scheme and the LRRE HARQ PPDUs with reference to detailed embodiments.

The purpose of sending the mode change request is to request to make a switch from the current operation mode to the LRRE HARQ mode. The mode change request may be a HARQ request frame. In an embodiment, the HARQ request frame may be an individual frame transmitted independently from the WTRU to the AP. In another embodiment, the HARQ request frame may be a part of other frames (e.g., trigger frames, UL data frames, etc.) transmitted by the WTRU. It will be appreciated that although some examples of the HARQ request frame have been given above, they are not intended to be exclusive or be limiting to the present application. The HARQ request frame may be implemented by any other available frames as long as they may help to realize the principle of this application. It will also be appreciated that the mode change request may also be transmitted by the AP to the WTRU if the AP initiates the mode change. The following description will further describe different scenarios about transmitting and receiving the mode change request.

In an embodiment, the mode change request may comprise a HARQ request. That is, the HARQ request may be a part of the mode change request. The HARQ request may indicate that the transmitter (e.g., the WTRU) sending the mode change request is trying to initiate communications through HARQ scheme. Therefore, the HARQ request is basically similar to those well-known HARQ requests sending by WTRUs during data transmission (e.g., UL data transmission from WTRUs to APs). After receiving this HARQ request, the receiver (e.g., the AP) may send a response regarding the HARQ request back to the transmitter. The following description will further describe this request-response processes in details.

In another embodiment, the mode change request may indicate a HARQ operation type. For example, the mode change request may comprise precise types of HARQ operations that it is requesting. In the method 800 and the WTRU according to this application, the mode change request may comprise LRRE as a type of HARQ operations. It should be noted that although this application described the method 800 and the WTRU for providing WLAN range extension based on the LRRE HARQ scheme, the principle of this application may also be implemented by other HARQ operation types, such as chase combining (CC) and incremental redundancy (IR).

In another embodiment, the mode change request may indicate a HARQ process mode. For example, the mode change request may comprise detailed HARQ process mode, such as OFDMA HARQ, Multiple Stop and Wait, Number of Concurrent HARQ Processes. The above-mentioned HARQ process modes are not intended to be exclusive or be limiting to the present application. The mode change request may also comprise other detailed HARQ process modes as long as they will help to realize the principle of this application.

In an embodiment, the mode change request may be a HARQ request. The HARQ request will request the AP to switch from its current mode to a HARQ mode (e.g., LRRE HARQ mode). Accordingly, a response (described below) transmitting from the AP may be a HARQ response.

Then, the method 800 may proceed to the process at 804. At 804, the method 800 may comprise: receiving a response regarding the mode change request from the AP. Accordingly, the receiver may receive a response regarding the mode change request from the AP.

To be specific, after receiving the mode change request, the AP may acknowledge the mode change request by transmitting a response (e.g., mode change response or HARQ request response) to the WTRU. The response may be a response frame (e.g., HARQ request response frame). In an embodiment, the response frame may be an individual frame transmitted independently from the AP. In another embodiment, the response frame may be a part of other frames (e.g., trigger frames, DL data frames, etc.) transmitted by the AP. It will be appreciated that although some examples of the response frame have been given above, they are not intended to be exclusive or be limiting to the present application. The response frame may be implemented by any other available frames as long as they may help to realize the principle of this application. It will also be appreciated that the response frame may also be transmitted by the WTRU to the AP if the AP is the transmitter of the above-mentioned mode change request. The following description will further describe different scenarios about transmitting and receiving the mode change request.

The mode change request may be sent by a station (either the WTRU or the AP) which initiates the mode change. For example, if the WTRU determines that the above first condition has been satisfied (e.g., the current distance between the WTRU and the AP is larger than the first value), then the WTRU may send the mode change request to the AP to initiate the mode change. In that case, the AP will receive the mode change request and then send the above-mentioned response to the WTRU. If the AP determines that the above first condition has been satisfied (e.g., the distance between the AP and the WTRU is larger than the first value), then the AP may send the mode change request to the WTRU to initiate the mode change. In that case, the WTRU will receive the mode change request and then send the above-mentioned response to the AP. Different scenarios about the sending the mode change request and receiving the response regarding the mode change request will be further illustrate with reference to extra embodiments below.

To be more specific, in order to switch to LRRE HARQ operation, the WTRU/the AP may request LRRE HARQ operation. If the AP/the WTRU responses with a HARQ response and/or an operation mode change response, the AP and the WTRU may commence the LRRE HARQ operation. In one example, the mode change request/response (or HARQ request/HARQ response) process may be done using the LRRE HARQ PPDUs.

In addition, the WTRU may request that the AP send an LRRE HARQ beacon in order to support LRRE HARQ processes. Such a request may be implied or as a part of the HARQ request or the mode change request. The AP may then start to transmit the LRRE HARQ beacon carried in LRRE HARQ PPDUs.

Then, the method 800 may proceed to the process at 805. At 805, the method 800 may comprise communicating with the AP through at least one physical layer convergence procedure (PLOP) protocol data unit (PPDU) using a PPDU structure, wherein the PPDU structure comprises fields including (1) at least one field enabling transmissions from the WTRU to the AP under the first condition and/or (2) a LRRE HARQ mode indication. Accordingly, the WTRU may communicate with the AP through a physical layer convergence procedure (PLOP) protocol data unit (PPDU) using a PPDU structure, wherein the PPDU structure comprises fields including (1) at least one field enabling transmissions from the WTRU to the AP under the first condition and/or (2) a LRRE HARQ mode indication.

To be specific, after the above-mentioned processes at 803 and 804, the WTRU has change its operation mode to the LRRE HARQ mode, and the WTRU and the AP may communicate with each other in this mode. The term "communicate" means that the WTRU may transmit PPDUs to the AP, and the AP may also transmit PPDUs to the WTRU. The PPDUs transmitted between the WTRU and the AP may be the LRRE HARQ PPDUs having a PPDU structure specifically designed for transmissions in the LRRE HARQ mode. Before explaining this PPDU structure in detail, the following description will first illustrate extra embodiments of the methods according to this application.

Figure 8B:
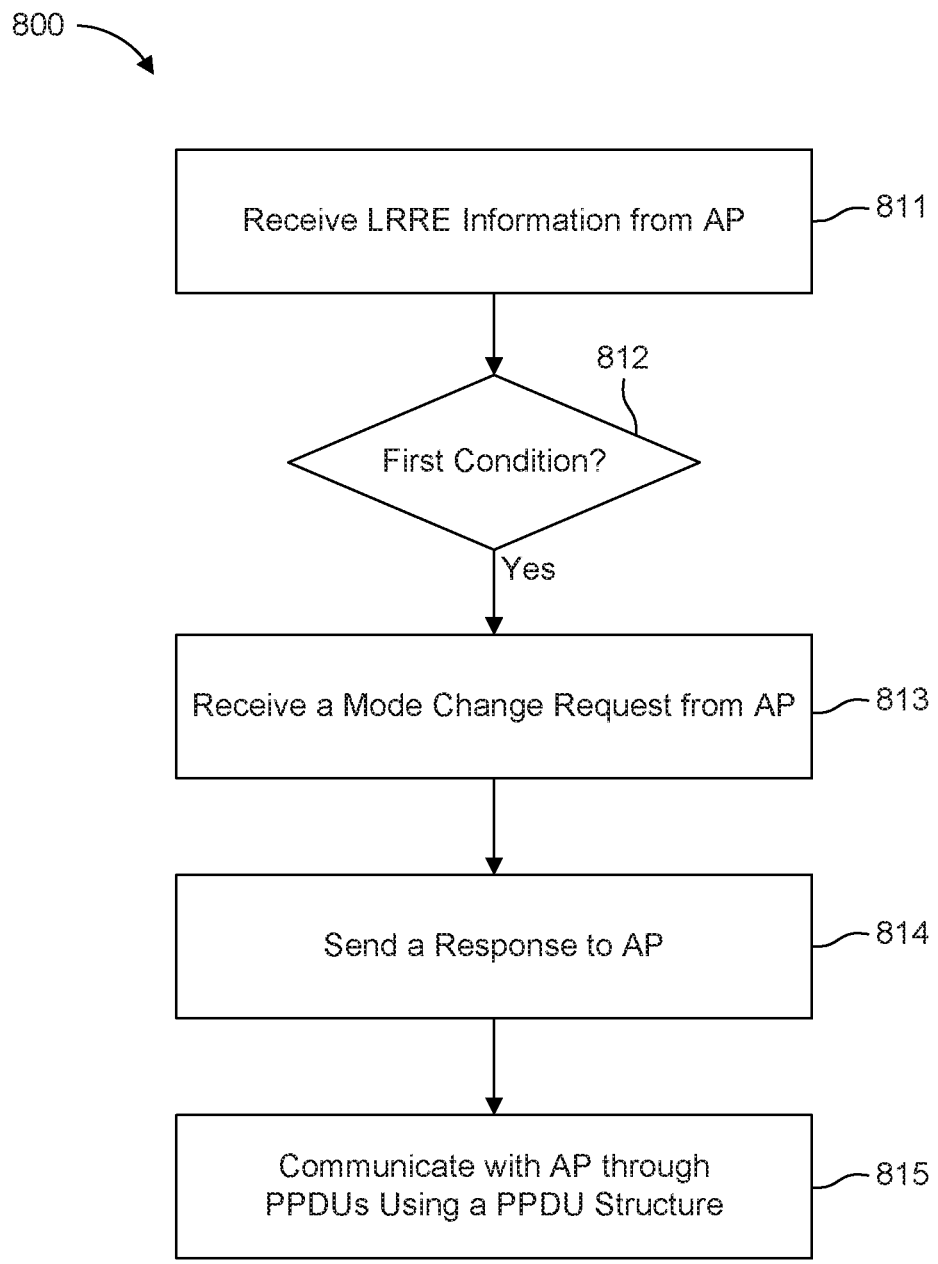
FIG. 8B is a diagram illustrating a method of providing range extension for WLAN according to a second embodiment of this application.

The second embodiment according to this application will be described with reference to FIG. 8B. FIG. 8B illustrates an exemplary flow chart of the method 800 according to the second embodiment of this application. It should be noted that the method 800 illustrated in FIG. 8B may be used by the WTRU according to this application. It should be noted that in the second embodiment, unless indicated otherwise, those terms (e.g., first condition, mode change request, response, etc.) are the same as or similar to the ones in the first embodiment above.

As shown in FIG. 8B, the method 800 may comprise at 811, receiving LRRE information from the AP; at 812, determining whether a first condition is satisfied by the WTRU; on a condition that the first condition is satisfied, at 813, receiving a mode change request from the AP to change an operation mode to a LRRE HARQ mode; at 814, sending a response regarding the mode change request to the AP; at 815, communicating with the AP through a PPDU using a PPDU structure wherein the PPDU structure comprises (1) at least one field enabling transmissions between the WTRU and the AP under the first condition and (2) a LRRE HARQ mode indication.

Figure 8C:
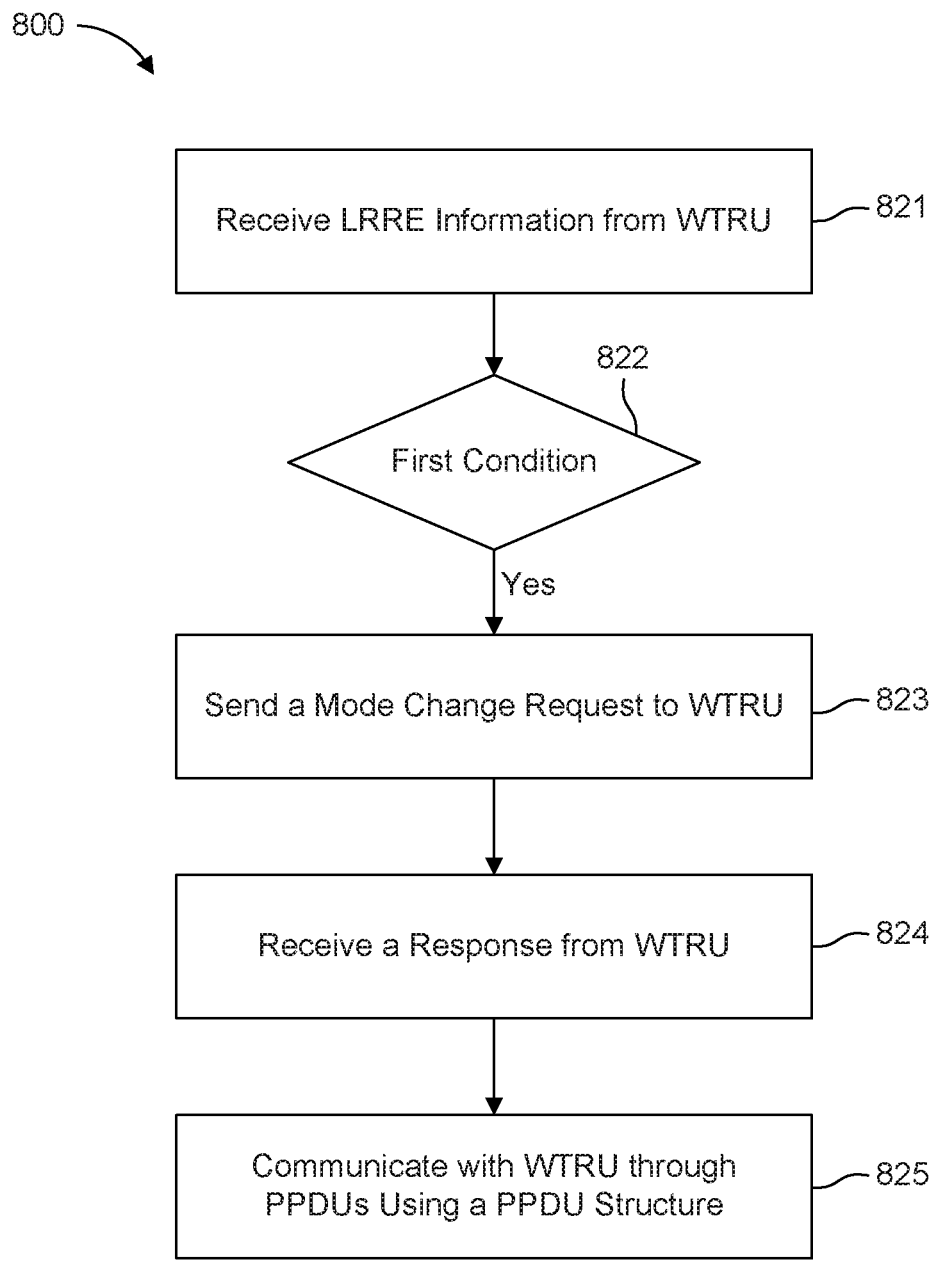
FIG. 8C is a diagram illustrating a method of providing range extension for WLAN according to a third embodiment of this application.

The third embodiment according to this application will be described with reference to FIG. 8C. FIG. 8C illustrates an exemplary flow chart of the method 800 according to the third embodiment of this application. It should be noted that the method 800 illustrated in FIG. 8C may be used by the AP according to this application. It should be noted that in the third embodiment, unless indicated otherwise, those terms (e.g., first condition, mode change request, response, etc.) are the same as or similar to the ones in the first embodiment above.

As shown in FIG. 8C, the method 800 may comprise at 821, receiving LRRE information from the WTRU; at 822, determining whether a first condition is satisfied; on a condition that the first condition is satisfied, at 823, sending a mode change request to the WTRU to change an operation mode to a LRRE HARQ mode; at 824, receiving a response regarding the mode change request from the WTRU; at 825, communicating with the WTRU through a PPDU using a PPDU structure, wherein the PPDU structure comprises: (1) at least one field enabling transmissions between the WTRU and the AP under the first condition and (2) a LRRE HARQ mode indication.

Figure 8D:
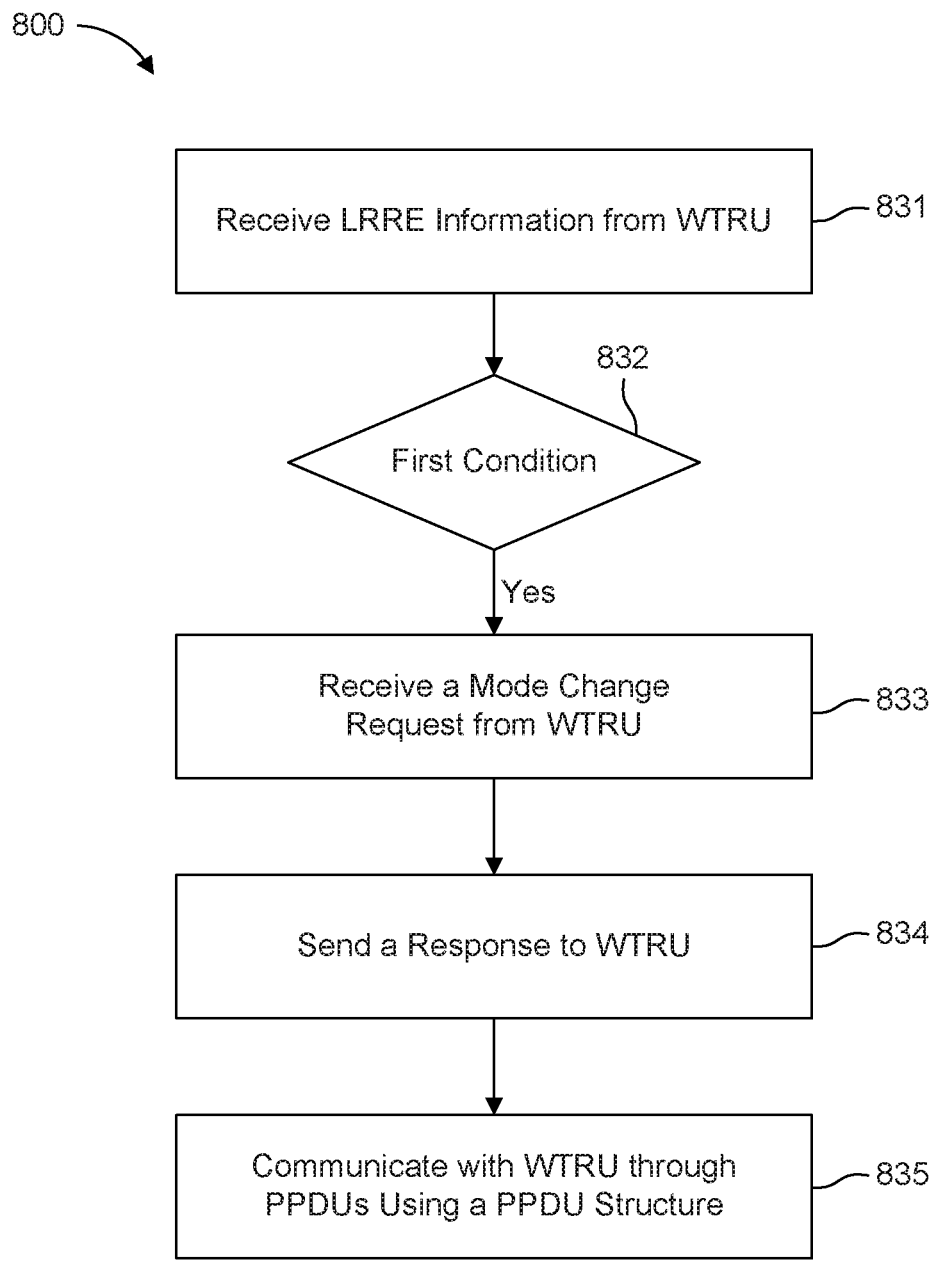
FIG. 8D is a diagram illustrating a method of providing range extension for WLAN according to a fourth embodiment of this application.

The fourth embodiment according to this application will be described with reference to FIG. 8D. FIG. 8D illustrates an exemplary flow chart of the method 800 according to the fourth embodiment of this application. It should be noted that the method 800 illustrated in FIG. 8D may be used by the AP according to this application. It should be noted that in the fourth embodiment, unless indicated otherwise, those terms (e.g., first condition, mode change request, response, etc.) are the same as or similar to the ones in the first embodiment above.

As shown in FIG. 8D, the method 800 may comprise at 831, receiving LRRE information from the WTRU; at 832, determining whether a first condition is satisfied; on a condition that the first condition is satisfied, at 833, receiving a mode change request from the WTRU to change an operation mode to a LRRE HARQ mode; at 834, sending a response regarding the mode change request to the WTRU; at 805, communicating with the WTRU through a PPDU using a PPDU structure wherein the PPDU structure comprises (1) at least one field enabling transmissions between the WTRU and the AP under the first condition and (2) a LRRE HARQ mode indication.

The following description will describe the PPDU structure used by the LRRE PPDUs according to this application. In order to provide a clear description, the LRRE PPDUs may also be referred to as the PPDUs. The newly designed PPDUs according to this application may be needed for the 6 GHz, HE devices or EHT devices.

As mentioned above, the PPDU structure may comprise at least one field enabling transmissions between the WTRU and the AP under the first condition. Preferably, the at least one field may comprise a plurality of fields enabling transmissions in a 6 GHz band.

Figure 9:
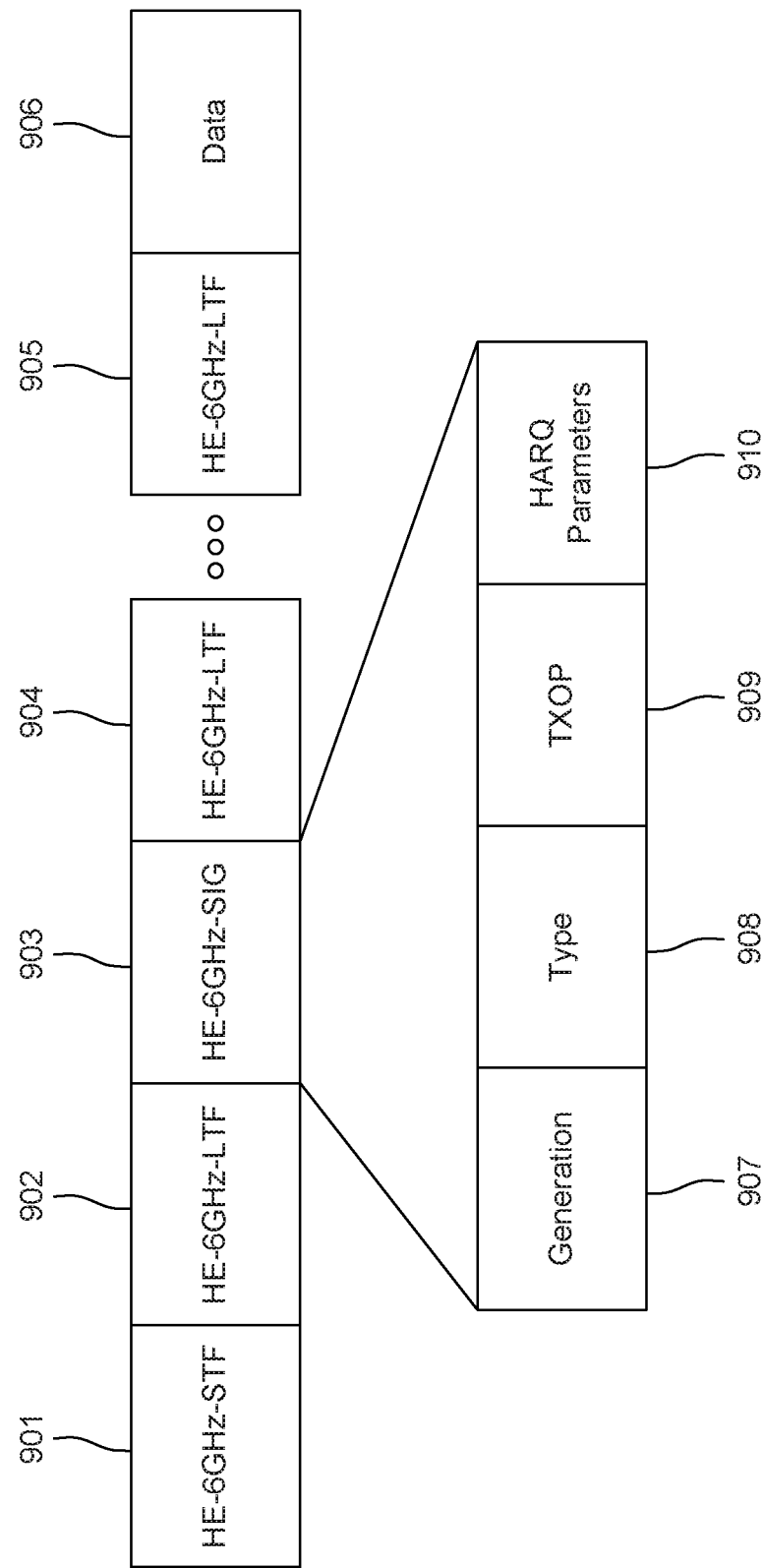
FIG. 9 is a diagram illustrating a high efficiency (HE) 6 GHz physical protocol data unit (PPDU) according to this application.

In an embodiment, the plurality of fields enabling transmissions in the 6 GHz band may comprise: at least one high efficient 6 GHz short training field (HE-6 GHz-STF), at least one HE 6 GHz long training field (HE-6 GHz-LTF), and at least one HE 6G Signal field (HE-6 GHz-SIG). FIG. 9 illustrates a HE 6 GHz PPDU structure as an example of the PLOP preambles for HE devices or EHT devices for the 6 GHz band.

As illustrated in FIG. 9, the HE 6 GHz PPDU may comprise multiple HE 6 GHz compatible portions (e.g., fields) when being transmitted in the 6 GHz band. As shown in FIG. 9, the HE 6 GHz PPDU may include at least one HE-6 GHz-STF (e.g., HE-6 GHz-STF 901), at least one HE-6 GHz-LTF (e.g., HE-6 GHz-LTFs 902, 904, and 905) and at least one HE-6 GHz-SIG (e.g., HE-6 GHz-SIG 903), and a Data field 906.

In an embodiment, the HE-6 GHz-STF and HE-6 GHz-LTF shown in FIG. 9 may follow the design of those regularly known HE STF and HE LTF in this art. In another embodiment, the HE-6 GHz-STF and/or HE-6 GHz-LTFs may be designed differently in order to do transmissions in the LRRE HARQ mode, i.e., to help to provide the range extension according to this application.

For example, the HE-6 GHz-STF and/or the HE-6 GHz-LTF shown in FIG. 9 may have more bits than those counterparts regularly known in this art so that the received power at a station (e.g., the WTRU or the AP) may be increased or the transmitting power at the station may be increased. That is, the HE-6 GHz-STF and/or HE-6 GHz-LTF may be extended in length. Preferably, the HE-6 GHz-STF and/or HE-6 GHz-LTF may have twice as many bits as those counterparts regularly known in this art. That is, the HE-6 GHz-STF and/or HE-6 GHz-LTF may be doubled in length compared to those regularly known HE STF and/or HE LTF so that the received power at a station (e.g., the WTRU or the AP) may be increased (e.g., the received power at a station may be increased by 3 dB) or the transmitting power at the station may be increased. It will be appreciated the received power at a station may be different based on different designs of the HE-6 GHz-STF and/or HE-6 GHz-LTF, and thus the example of 3 dB is not intended to be exclusive or be limiting to the present application.

In an embodiment, the number of those HE 6 GHz fields may also be increased for the purpose of increasing transmitting power or received power at a station. For example, the number of HE-6 GHz-STF and/or the HE-6 GHz-LTFs may be doubled compared to those HE-STF and HE-LTF in a regularly known PPDU. Preferably, there may be two HE-6 GHz-STFs and four HE-6 GHz-LTFs. These HE-6 GHz-STF and/or the HE-6 GHz-LTF may carry phase rotation or different modulation, or other indication to indicate that they are part of a LRRE HARQ PPDU, which may be a PPDU that is transmitted using the LRRE HARQ scheme.

The PPDU structure may also comprise a LRRE HARQ mode indication indicating that the LRRE HARQ PPDUs are transmitting in the LRRE HARQ mode or the PPDUs are LRRE HARQ PPDUs. This LRRE HARQ mode indication may any one or a combination of generation, type, TXOP, and HARQ parameters as discussed below.

In an embodiment, the at least one field in the PPDU structure may comprise a first subfield indicating a generation of the PPDU, i.e., a generation subfield. The at least one field comprising the first subfield may be any one of the HE-6 GHz-STF, the HE-6 GHz-LTF and the HE-6 GHz-SIG.

For example, as shown in FIG. 9, the HE-6 GHz-SIG field comprises a Generation subfield 907. The Generation subfield may include the indication of the generation of the PPDU that follows the HE-6 GHz-SIG. Possible values may include 11ax, EHT, or future generations of PPDU. The format of the remaining PPDU may depend on the generation indication provided in this subfield.

In an embodiment, the at least one filed in the PPDU structure may comprise a second subfield indicating a type of the PPDU that follows the HE-6 GHz-SIG, i.e., a type subfield. The at least one field comprising the second subfield may be any one of the HE-6 GHz-STF, the HE-6 GHz-LTF and the HE-6 GHz-SIG.

For example, as shown in FIG. 9, the HE-6 GHz-SIG field comprises a type subfield 908. Possible values of the type may include SU, MU, Trigger Based PPDU, MU-MIMO PPDU, SU-MIMO PPDU, HARQ PPDU, OFDMA PPDU, Multi-AP Joint Transmission, Multi-AP HARQ. The type of PPDU may indicate the format of the remaining PPDU. For example, if the type of the PPDU indicates that it is a LRRE HARQ PPDU or an extended range PPDU, then the PPDU may carry additional HARQ parameters.

In an embodiment, the at least one field in the PPDU structure may comprise a third subfield comprising a transmit opportunity (TXOP) information, i.e., a TXOP subfield. The at least one field comprising the third subfield may be any one of the HE-6 GHz-STF, the HE-6 GHz-LTF and the HE-6 GHz-SIG.

For example, as shown in FIG. 9, the HE-6 GHz-SIG field comprises a TXOP subfield 909. The TXOP subfield may carry the TXOP related information. For example, if it is carried in the PPDU from a WTRU to an AP, which may be indicated by the UPLINK flag set to 1 in the PLOP preamble, the TXOP may be a request for uplink TXOP.

In an embodiment, the at least one field in the PPDU structure may comprise a fourth subfield comprising at least one HARQ parameter, i.e., a HARQ parameters subfield. The at least one field comprising the fourth subfield may be any one of the HE-6 GHz-STF, the HE-6 GHz-LTF and the HE-6 GHz-SIG.

For example, as shown in FIG. 9, the HE-6 GHz-SIG field comprises a HARQ parameters subfield 910. The HARQ parameters subfield may include the HARQ related parameters, such as HARQ Process ID, RV, Indication of Initial or Retransmissions. In an embodiment, the first part of the HE 6 GHz preamble (e.g., HE-6 GHz-SIG) may indicate that the HE PPDU may be LRRE HARQ PPDU or Extended Range HARQ PPDU (i.e., the first part of the HE 6 GHz preamble may comprise the LRRE HARQ mode indication), and a later part of HE 6 GHz preamble (e.g., HE-6 GHz-SIG2, not shown in FIG. 9) may include the HARQ parameters.

FIG. 9 illustrates that the HE-6 GHz-SIG field may include one or more subfields or parameters. It should be noted that the one or more fields may include, but are not limited to, the above mentioned subfields of generation, type, TXOP, and HARQ parameters. The example shown in FIG. 9 is not intended to be exclusive or be limiting to the present application. In an embodiment, the above-mentioned subfields may be included in one of other fields, such as HE-6 GHz-STF and HE-6 GHz-LTF. In another embodiment, the above-mentioned subfields may be included in multiple fields shown in FIG. 9 at the same time.

In an embodiment, the plurality of fields enabling transmission in the 6 GHz band may comprise: at least one extremely high throughput 6 GHz short training field (EHT-6 GHz-STF), at least one EHT 6 GHz long training field (EHT-6 GHz-LTF), and at least one EHT 6 GHz Signal field (EHT-6 GHz-SIG). FIG. 10 illustrates a EHT 6 GHz PPDU structure.

As illustrated in FIG. 10, The EHT 6 GHz PPDU may comprise multiple EHT 6 GHz compatible portions (e.g., fields) when being transmitted in the 6 GHz band. As shown in FIG. 10, the EHT 6 GHz PPDU may include at least one EHT-6 GHz-STF (e.g., EHT 6 GHz STF 1001), at least one EHT-6 GHz-LTF (e.g., EHT 6 GHz LTF 1002), at least one EHT-6 GHz-SIG (e.g., EHT 6 GHz SIG 1003) and a Data 1006.

In an embodiment, the EHT-6 GHz-STF and the EHT-6 GHz-LTF shown in FIG. 10 may follow the design of the regularly known EHT STF and EHT LTF field in this art. In another embodiment, the EHT-6 GHz-STF and the EHT-6 GHz-LTF may be designed differently in order to do transmissions in the LRRE HARQ mode, i.e., to help to provide the range extension according to this application.

For example, the EHT-6 GHz-STF and/or the EHT-6 GHz-LTF shown in FIG. 10 may have more bits than those counterparts regularly known in this art so that the received power at a station (e.g., the WTRU or the AP) may be increased or the transmitting power at the station may be increased. That is, the EHT-6 GHz-STF and/or the EHT-6 GHz-LTF may be extended in length. Preferably, the EHT-6 GHz-STF and/or the EHT-6 GHz-LTF may have twice as many bits as those counterparts regularly known in this art. That is, the EHT-6 GHz-STF and/or EHT-6 GHz-LTF may be doubled in length compared to those regularly known EHT STF and/or EHT LTF so that the received power at a station (e.g., the WTRU or the AP) may be increased or the transmitting power at the station may be increased. Preferably, the received power at a station receiving the PPDU may be increased by 3 dB. It will be appreciated the received power at a station may be different based on different designs of the EHT-6 GHz-STF and/or the EHT-6 GHz-LTF, and thus the example of 3 dB is not intended to be exclusive or be limiting to the present application.

In an embodiment, the number of those EHT 6 GHz fields may also be increased for the purpose of increasing transmitting power or received power at a station. For example, the number of EHT-6 GHz-STF and/or the EHT-6 GHz-LTFs may be doubled compared to those EHT-STF and EHT-LTF in a regularly known PPDU. Preferably, there may be two EHT-6 GHz-STFs and four EHT-6 GHz-LTFs. These EHT-6 GHz-STF and/or the EHT-6 GHz-LTF may carry phase rotation or different modulation, or other indication to indicate that they are part of a LRRE HARQ PPDU, which may be a PPDU that is transmitted using the LRRE HARQ scheme.

The PPDU structure may also comprise a LRRE HARQ mode indication indicating that the LRRE HARQ PPDUs are transmitting in the LRRE HARQ mode or the PPDUs are LRRE HARQ PPDUs. For example, the LRRE HARQ PPDUs may include indications in its PLOP preamble that they are LRRE HARQ PPDUs, which may indicate extra number of STFs and LTFs fields, or additional power boost for SIG fields in the PLOP preambles. In another example, the extra fields, such as additional STFs, LTFs, and/or SIG fields, and/or HARQ parameter fields may be added to the PLOP preamble in order to ensure that HARQ information can be decoded correctly at the receiving station (e.g., the WTRU).

This LRRE HARQ mode indication may any one or a combination of generation, type, TXOP, and HARQ parameters as discussed below.

In an embodiment, the at least one field in the PPDU structure may comprises a first subfield indicating a generation of the PPDU, i.e., a generation subfield. The at least one field comprising the first subfield may be any one of the EHT-6 GHz-STF, the EHT-6 GHz-LTF and the EHT-6 GHz-SIG.

For example, as shown in FIG. 10, the EHT-6 GHz-SIG field comprises a Generation subfield 1007. The Generation subfield may include the indication of the generation of the PPDU that follows the EHT-6 GHz-SIG. Possible values may include 11 ax, EHT, or future generations of PPDU. The format of the remaining PPDU may depend on the generation indication provided in this subfield. The generation of other type of indications may indicate that a wider or narrower band transmissions following the PLOP preamble.

In an embodiment, the at least one filed in the PPDU structure may comprise a second subfield indicating a type of the PPDU that follows the EHT-6 GHz-SIG, i.e., a type subfield. The at least one field comprising the second subfield may be any one of the EHT-6 GHz-STF, the EHT-6 GHz-LTF and the EHT-6 GHz-SIG.

For example, as shown in FIG. 10, the EHT-6 GHz-SIG field comprises a type subfield 1008. Examples of possible values may include, but are not limited to, SU, MU, Trigger Based PPDU, MU-MIMO PPDU, SU-MIMO PPDU, HARQ PPDU, OFDMA PPDU, Multi-AP Joint Transmission, and Multi-AP HARQ. The type of PPDU may indicate the format of the remaining PPDU. For example, if the type of the PPDU indicates that it is a LRRE HARQ PPDU, or an extended range PPDU, then the PPDU may carry additional HARQ parameters.

In an embodiment, the at least one field in the PPDU structure may comprise a third subfield comprising a transmit opportunity (TXOP) information, i.e., a TXOP subfield. The at least one field comprising the third subfield may be any one of the EHT-6 GHz-STF, the EHT-6 GHz-LTF and the EHT-6 GHz-SIG. For example, as shown in FIG. 10, the EHT-6 GHz-SIG field comprises a TXOP subfield 1009. The content of the TXOP subfield may be defined similarly as defined above with reference to FIG. 9.

In an embodiment, the at least one field in the PPDU structure may comprise a fourth subfield comprising at least one HARQ parameter, i.e., a HARQ parameter subfield. The at least one field comprising the fourth subfield may be any one of the EHT-6 GHz-STF, the EHT-6 GHz-LTF and the EHT-6 GHz-SIG. For example, as shown in FIG. 10, the EHT-6 GHz-SIG field comprises a HARQ parameter subfield 1010. The HARQ parameters may be defined similarly as those defined above with reference to FIG. 9.

Without loss of generality, a LRRE HARQ PPDU design on other bands may follow similar design patterns. For example, a LRRE HARQ PPDU design on 5 GHz band may have a similar design as shown in FIGS. 9-10.

FIG. 10 illustrates that the EHT-6 GHz-SIG field may include one or more subfields or parameters. It should be noted that the one or more fields may include, but are not limited to, the above mentioned subfields of generation, type, TXOP, and HARQ parameters. The example shown in FIG. 10 is not intended to be exclusive or be limiting to the present application. In an embodiment, the above-mentioned subfields may be included in one of other fields, such as EHT-6 GHz-STF and EHT-6 GHz-LTF. In another embodiment, the above-mentioned subfields may be included in multiple fields shown in FIG. 10 at the same time.

Preferably, the at least one field comprises: at least one extremely high throughput short training field (EHT STF), at least one EHT long training field (EHT LTF), at least one EHT signal field (EHT SIG), and at least one EHT mark field (EHT Mark).

Figure 11:
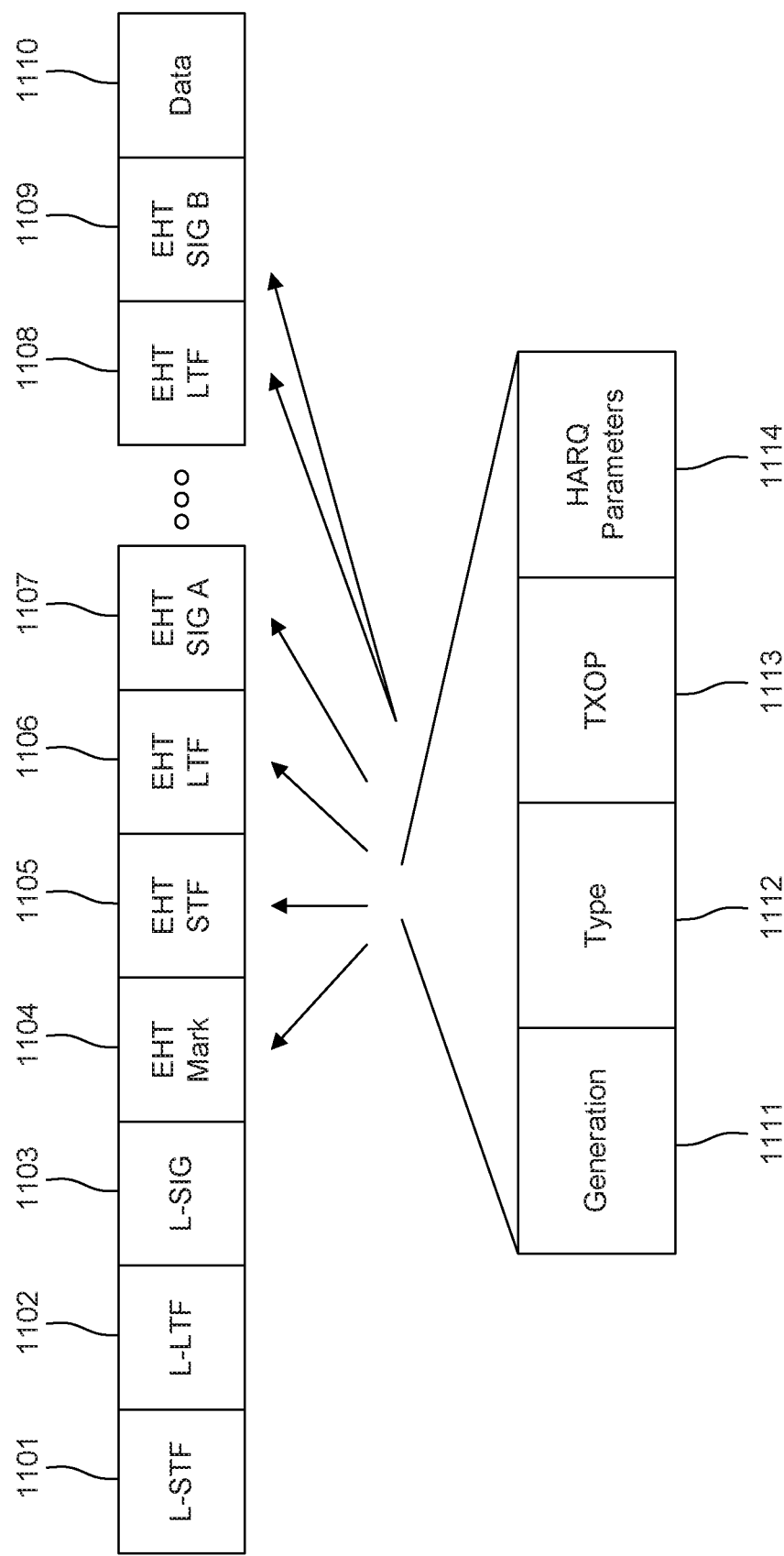
FIG. 11 is a diagram illustrating an EHT PPDU format for multiple frequency bands according to this application.

FIG. 11 illustrates an example of EHT PPDU structure for multiple frequency bands. In one example, for the 2.4, 5 GHz band, or other bands, the LRRE HARQ PPDU may include an additional indication that the PPDU is a HARQ PPDU. An example design of the EHT PPDU structure according to this application is shown in FIG. 11. The EHT PPDU may be transmitted on a frequency band that may have older generation of WLAN devices operating, such as Sub 1 GHz, 2.4 GHz, 5 GHz band, or the like.

As shown in FIG. 11, the example design of the EHT PPDU may have one or more of the fields such as EHT MARK 1104, EHT STF 1105, EHT LTFs 1106 and 1108, EHT SIG A 1107, and EHT SIG B 1109 after the legacy portions (e.g., L-STF, L-LTF and L-SIG).

The EHT MARK field may include indication indicating that the PPDU is an EHT PPDU. In addition, there may be additional indication that the current PPDU is a LRRE HARQ PPDU. Therefore, the EHT MARK may also be considered as the LRRE HARQ mode indication as described above.

The EHT STF field may provide a STF for EHT devices. The number of EHT STF fields may depend on whether there has been an indication that the current PPDU is a LRRE HARQ PPDU in the EHT MARK 1104. The EHT STF may have the same or similar function as that shown in FIG. 9 in order to increase transmitting power at a station (e.g., the WTRU) or increase receiving power at a station (e.g., the AP).

The EHT LTF field may provide a LTF for EHT devices. The number of EHT LTF fields may depend on whether there has been an indication that the current PPDU is a LRRE HARQ PPDU in the EHT MARK 1104. The EHT LTF may have the same or similar function as that shown in FIG. 9 in order to increase transmitting power at a station (e.g., the WTRU) or increase receiving power at a station (e.g., the AP).

The EHT SIG A subfield may provide partly a SIG indication for the remainder of the PPDU. The EHT SIG B subfield may provide partly a SIG indication for the remainder of the PPDU.

The PPDU structure may also comprise a LRRE HARQ mode indication indicating that the LRRE HARQ PPDUs are transmitting in the LRRE HARQ mode or the PPDUs are LRRE HARQ PPDUs. This LRRE HARQ mode indication may any one or a combination of subfields of generation, type, TXOP, and HARQ parameters as discussed below. In an example, one or more fields of the EHT Mark, the EHT STF, the EHT LTF, the EHT SIG A, and the EHG SIG B in the EHT PLOP preamble may include one or more subfields of generation, type, TXOP, and HARQ parameters. The generation subfield, the type subfield, the TXOP subfield and the HARQ parameters subfield may be defined similarly as those defined above with reference to FIG. 9.

For example, as shown in FIG. 11, one or more fields above may comprise a generation subfield 1111. The Generation subfield may include the indication of the generation of the PPDU. Possible values may include 11 ax, EHT, or future generations of PPDU, 11ba+. The format of the remaining PPDU may depend on the Generation indication provided in this subfield. The generation of other type of indications may indicate that a wider or narrower band transmissions following the PLOP preamble.

As shown in FIG. 11, one or more fields above may comprise a type subfield 1112 indicating the type of PPDU may follow the SIG (e.g., L-SIG and EHT SIG A). Examples of possible values may include, but are not limited to, SU, MU, Trigger Based PPDU, MU-MIMO PPDU, SU-MIMO PPDU, HARQ PPDU, OFDMA PPDU, Multi-AP Transmission, Multi-AP Joint Transmission, and Multi-AP HARQ. The type of PPDU indication may dictate the format of the remaining PPDU. For example, if the type of the PPDU indicates that it is a HARQ PPDU, or Extended Range PPDU, then the PPDU may carry additional HARQ Parameters.

As shown in FIG. 11, one or more fields above may comprise a TXOP subfield 1113, and one or more fields above may comprise a HARQ parameters subfield 1114. The TXOP subfield and the HARQ parameters subfield may be defined similarly as those defined above with reference to FIG. 9.

Alternatively or additionally, the AP may request operation mode change by transmitting a mode change request or HARQ request, which may include similar HARQ mode, HARQ type or parameters as described above. The WTRU may respond with a response or HARQ response.

Once the response/HARQ response has been received with success, the WTRU and the AP may communicate with each other using HARQ operations (e.g., using those LRRE HARQ PPDUs described above).

During the communication between the WTRU and the AP, either of them may transmit a disassociation request carried in LRRE HARQ PPDUs to conduct disassociation.

Embodiments for LRRE HARQ association support will be described as follows. A WTRU may utilize LRRE HARQ operations to conduct association with an AP that supports the operation. The LRRE HARQ association procedure may be as follows.

An AP may transmit LRRE HARQ beacons carried in LRRE PPDUs in order to support LRRE HARQ association processes. The LRRE HARQ PPDUs may include indications in its PLOP preambles that they are LRRE HARQ PPDUs, which may indicate extra number of STFs and LTFs, or additional power boost for SIG fields in the PLOP preambles. In one example, the extra fields, such as additional STFs, LTFs, and/or SIG fields, and/or HARQ parameter fields may be added to the PLOP preambles in order to ensure that HARQ information can be decoded correctly at the receiving STA.

In another example, a number of LRRE HARQ beacons may be transmitted consecutively or with fixed intervals so that the beacons may be combined at the receiving STAs. The TSF timer may be the same across a number of LRRE HARQ beacons in order to guarantee the combining.

The WTRU may receive LRRE HARQ beacons, or it may be aware of the presence of the AP from pre-acquired knowledge, or from ESS information. The WTRU may send a number of Probe Request, Authentication Request and/or (Re)Association Request frames carried in LRRE PPDUs consecutively or with fixed interval so that the packets can be combined correctly at the receiving AP. The Probe Request/Response, Authentication Request/Response, (Re) Association Request/Response may include HARQ Request element. The WTRU and the AP may then exchange packets carried in LRRE PPDUs in order to communicate over an extended range.

Once the channel condition improves, the WTRU or the AP may decide to change operation mode to use normal PPDUs or other HARQ operations, i.e., to stop using the LRRE HARQ mode and swift to other operation mode (e.g., a default mode).

Embodiments for HARQ resource allocation via 2.4 GHz assistance will be described as follows. Given that an AP generally has a power greater than or equal to (>=) 5 dB tx power (i.e., a power greater than that of a WTRU), it is possible that a WTRU at cell edge can receive beacons and broadcast control frames in DL, but in the UL direction the WTRU may not reach the AP.

In a broadcast triggered TWT, the dedicated/random access RU size/location/target UL RSSI/MCS assigned by AP in a Trigger Frame (TF) in a TWT service period may not be achievable by the WTRU which has moved to cell edge since the last radio contact with the AP.

Figure 12:
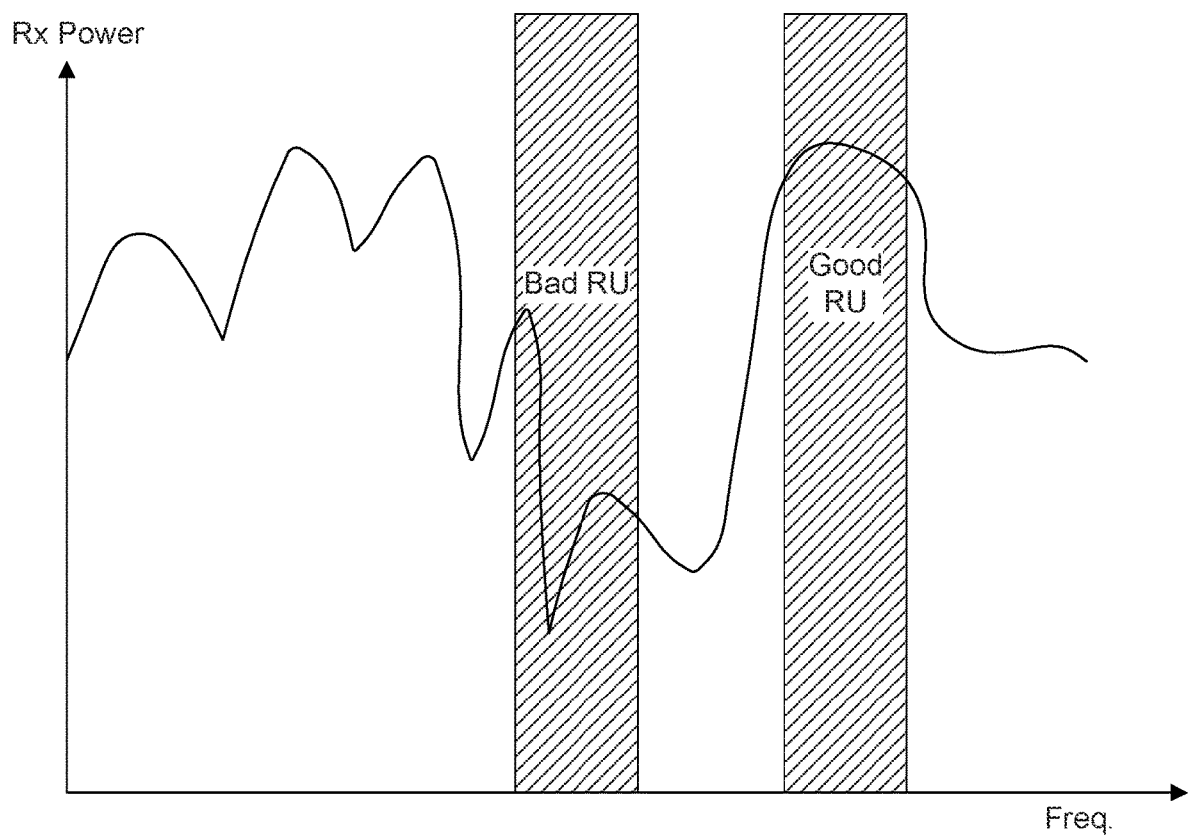
FIG. 12 is a diagram illustrating a frequency selective channel according to this application.

FIG. 12 illustrates an example of frequency selective channel. As shown in FIG. 12, based on the estimated channel of the most recently received DL broadcast (beacon) frame, a WTRU may be able to reach an AP if a 'Good Resource Unit (Good RU)' is assigned to the WTRU. The WTRU may fail to reach the AP if the RU assigned (or the RU derived from the random access procedure) happens to be a 'Bad RU'. When the STA receives the beacon frame assigning the broadcast TWT service period, it has no idea which scenario will occur when the TWT service period starts.

In one embodiment, the MCS selection may be determined by the WTRU instead of signaled in the TF. A 'min. target UL RSSI' (or possibly a 'min. RU size'/'min. UL duration') may be indicated by the AP, possibly in a beacon frame, then the WTRU may base on these information, and its power headroom derived from the path loss (possible based on the beacon frame) to choose a MCS. The WTRU may choose its MCS after it has received the TF indicating the size/location of the RU.

In another embodiment, the random access RU may not be contiguous and may be interlaced with dedicated/non-assigned RUs. A STA with DL RSSI lower than a certain threshold may not follow the random RU index selection procedure currently defined in 11ax, but instead to choose a feasible random access RU which satisfies the power headroom limitation.

In another embodiment, an AP may use its 5/6 GHz beacon frame not only to allocate broadcast TWT service period(s) in 5/6 GHz primary channel, but also TWT service period in a 2.4 GHz channel operated by the same/collocated AP. Given congestions in the 2.4 GHz band, such service period may be short and is assumed not to occupy too much channel time.

In this embodiment, the triggered TWT in 2.4 GHz band may precede the triggered TWT in 5/6 GHz band. A WTRU, based on its observation of the beacon frame in 5/6 GHz primary channel and the above specified information included in the beacon frame, may determine that in certain RU allocation(s), it is impossible to reach the AP. Such WTRU may perform a random access in the 2.4 GHz triggered TWT. In this UL transmission, which generally reaches a longer distance than in 5/6 GHz channel, the WTRU may indicate its preferred 5/6 GHz UL RU index and MCS, to bootstrap scheduled UL transmission(s) in 5/6 GHz band.

If UL payload is short, the WTRU may finish the payload transmission in the 2.4 GHz PPDU and indicate no UL resource is needed. If UL payload has not been completely transmitted in the duration of the 2.4 GHz Trigger Based (TB) PPDU, the AP may use the indicated information to schedule UL transmission in the 5/6 GHz triggered TWT, with RU index and power control settings which are feasible to the STA.

Figure 13:
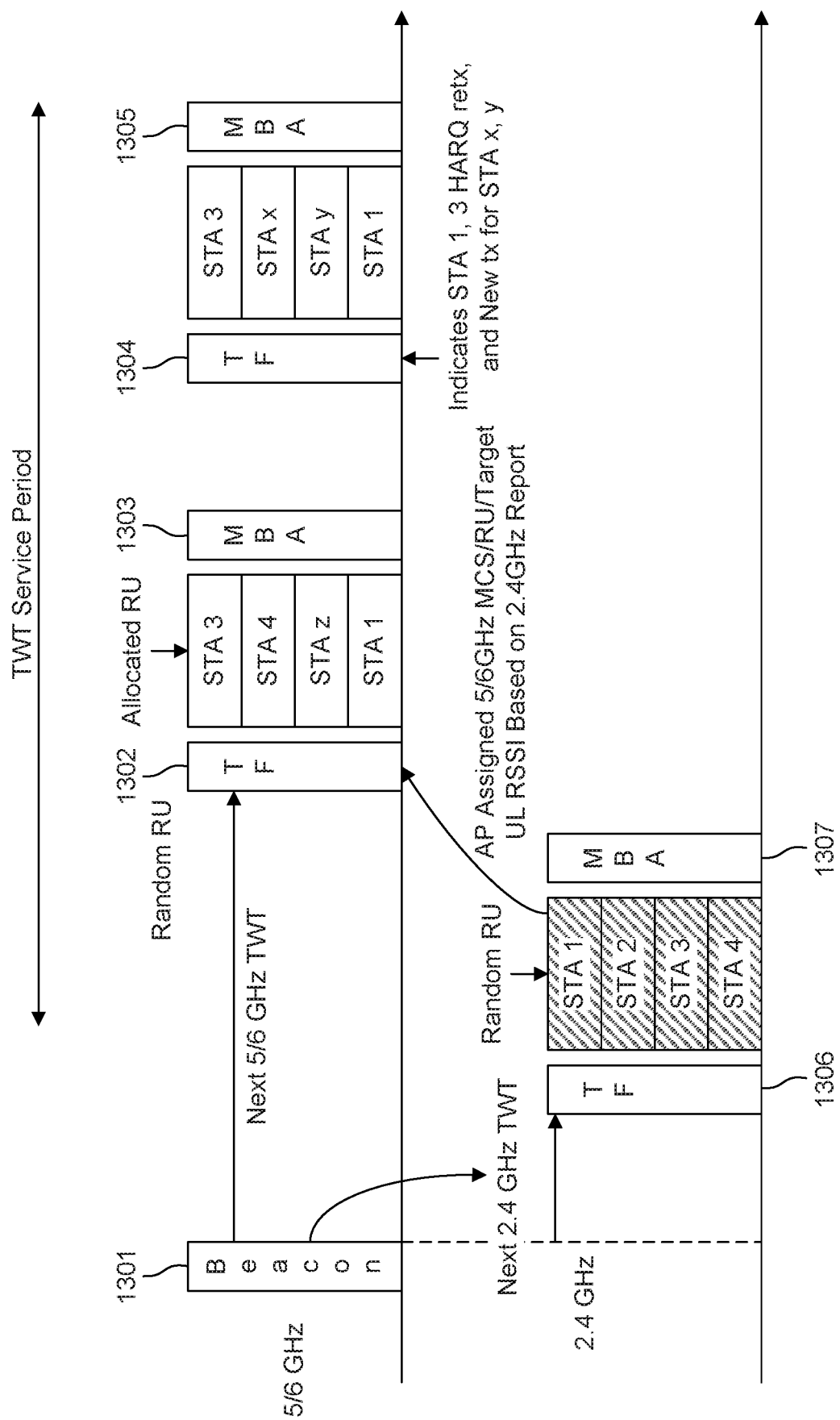
FIG. 13 is a diagram illustrating a cell-edge stations (STAs) using 2.4 GHz target wake time (TWT) service period (SP) to bootstrap 5/6 GHz uplink (UL) resource unit (RU) allocation according to this application.

FIG. 13 illustrates an example cell-edge stations (i.e., WTRUs) using 2.4 GHz target wake time (TWT) service period (SP) to bootstrap 5/6 GHz uplink (UL) resource unit (RU) allocation. As illustrated in FIG. 13, four WTRUs (i.e., STA 1, STA 2, STA 3, and STA 4) have determined that it cannot reach the AP based on the provided 'min. target UL RSSI' and the minimum MCS, on certain RU indices, after receiving the beacon frame in 5/6 GHz (i.e., Beacon 1301). They perform random access in 2.4 GHz in a triggered TWT announced in the beacon frame.

Given that the path loss in 2.4 GHz band is lower, the transmissions between the WTRUs and the AP may be successful. The AP may receive their preferred UL RU indices/MCS and feasible target RSSIs. The STA 2 may have a short payload so it indicates no further UL resources are needed in the UL transmission. The STAs 1, 3, 4 may tune to the 5/6 GHz channel for the scheduled 5/6 GHz TWT. In the TF (e.g., TF 1302, TF 1304 and TF 1306) starting the TWT, STA 1, 3, 4 may be scheduled using their indicated RUs/MCSs. The TB-PPDU reception may be successful for STA 4, but not for STAs 1 and 3. The AP may schedule HARQ retransmission of STAs 1 and 3 in a next TB-PPDU within the same TWT service period using their preferred settings.

In this embodiment, the UL transmission in 2.4 GHz may be similar to a 'preamble' to the following 5/6 GHz UL transmissions, assuming the probability of decoding preamble being higher with the improved path loss.

Embodiments for collision aware HARQ transmission procedure will be described as follows.

In general, a blank period or resource in which the transmitter does not transmit any power may be configured in the transmitted packet to enable the receiver continuously estimate the SINR of the packet and based on this estimate, identify the occurrence of a collision. The following sections detail the different examples by which this may be implemented in EHT.

First, embodiments for no-power midamble for collision estimation are described herein.

In one embodiment, dedicated mid-ambles with no power transmitted from the transmitter may be used. The receiving STA may estimate the interference power from these resources and use this to estimate the presence of absence of a collision. The midambles may be configured to occur at specified intervals, in such a manner that they are STA specific or BS specific. STA-specific midambles have midamble patterns that are specific to each STA (or group of STAs) within the BSS. This assumes that collisions may occur from STAs within the same BSS. Signalling for the positions of the Collision Estimation mid-amble may be placed in an EHT preamble. BSS-specific midambles occur such that all STAs within a BSS may have the same midamble structure. This assumes that the collisions are from OBSS STAs. Signalling for the positions of the Collision Estimation midamble may be placed in an EHT preamble, may be sent by a dedicated Collision Estimation midamble configuration packet, may be configured in the Beacon or may be set up during STA association.

FIG. 13 illustrates an example no power collision estimation midamble. The midamble positions may be static (i.e. fixed for the duration of the packet), or dynamic (i.e. change over the duration of the packet).

The AP and STA may include capability bits to indicate support for the collision estimation mid-amble.

The C-E midamble signalling, for example, the EHT preamble, may include a bit to indicate the presence of the collision estimation midamble in the packet.

The CE midamble signalling, for example, the EHT preamble, may include a field to indicate the position of the first Collision Estimation midamble.

The CE midamble signalling, for example, the EHT preamble, may include a field to indicate the Collision Estimation midamble update interval.

The CE midamble signalling, for example, the EHT preamble, may include a field to indicate the number of OFDM symbols used for the Collision Estimation midamble.

Figure 14:
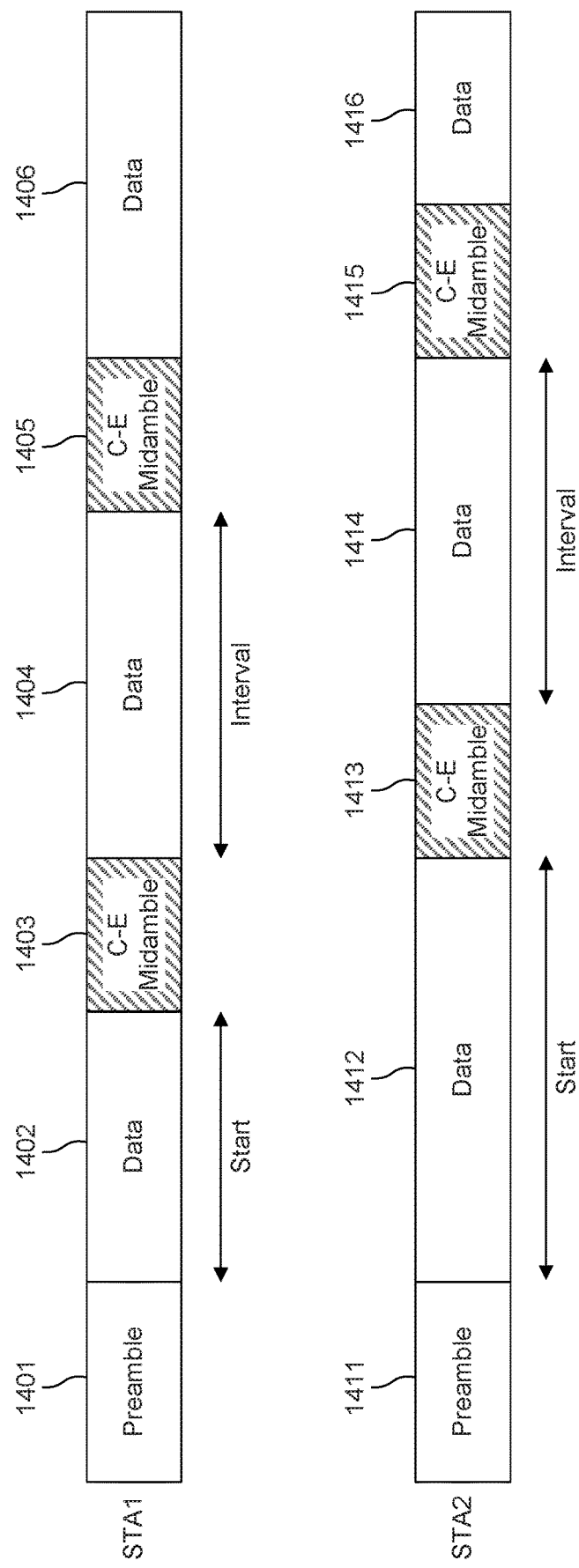
FIG. 14 is a diagram illustrating an example no power collision estimation midamble according to this application.

Embodiments for partial power midamble for collision estimation will be described with reference to FIG. 14. As shown in FIG. 14, each of the stations (i.e., STA1 and STA2) may comprise a PPDU comprising fields of preamble data CE midamble. For example, a first PPDU may comprise preamble 1401, data 1402, 1404 and 1406, and C-E midamble 1403 and 1405. A second PPDU may comprise preamble 1411, data 1412, 1414 and 1416, and C-E midamble 1413 and 1415.

In one embodiment, dedicated mid-ambles with power transmitted on some OFDM tones and no power transmitted on other OFDM tones may be used. The midamble configuration may be set similar to the no-power mid-amble discussed above. The receiving STA estimate the SINR from these resources and use this to estimate the presence of absence of a collision.

The AP and STA may include capability bits to indicate support for the collision estimation midamble.

The CE midamble signalling, for example, the EHT preamble, may include a bit to indicate the presence of the collision estimation mid-amble in the packet.

The CE midamble signalling, for example, the EHT preamble, may include a field to indicate the position of the first Collision Estimation mid-amble.

The CE midamble signalling, for example, the EHT preamble, may include a field to indicate the Collision Estimation midamble update interval.

The CE midamble signalling, for example, the EHT preamble, may include a field to indicate the number of OFDM symbols used for the Collision Estimation midamble.

The CE midamble signalling, for example, the EHT preamble, may include fields to indicate the OFDM subcarriers that are zero power.

In one example, the CE midamble may comprise of an LTF signal, for example, the EHT-LTF, with a pre-determined set of punctured sub-carriers with no power transmitted on them.

Figure 15:
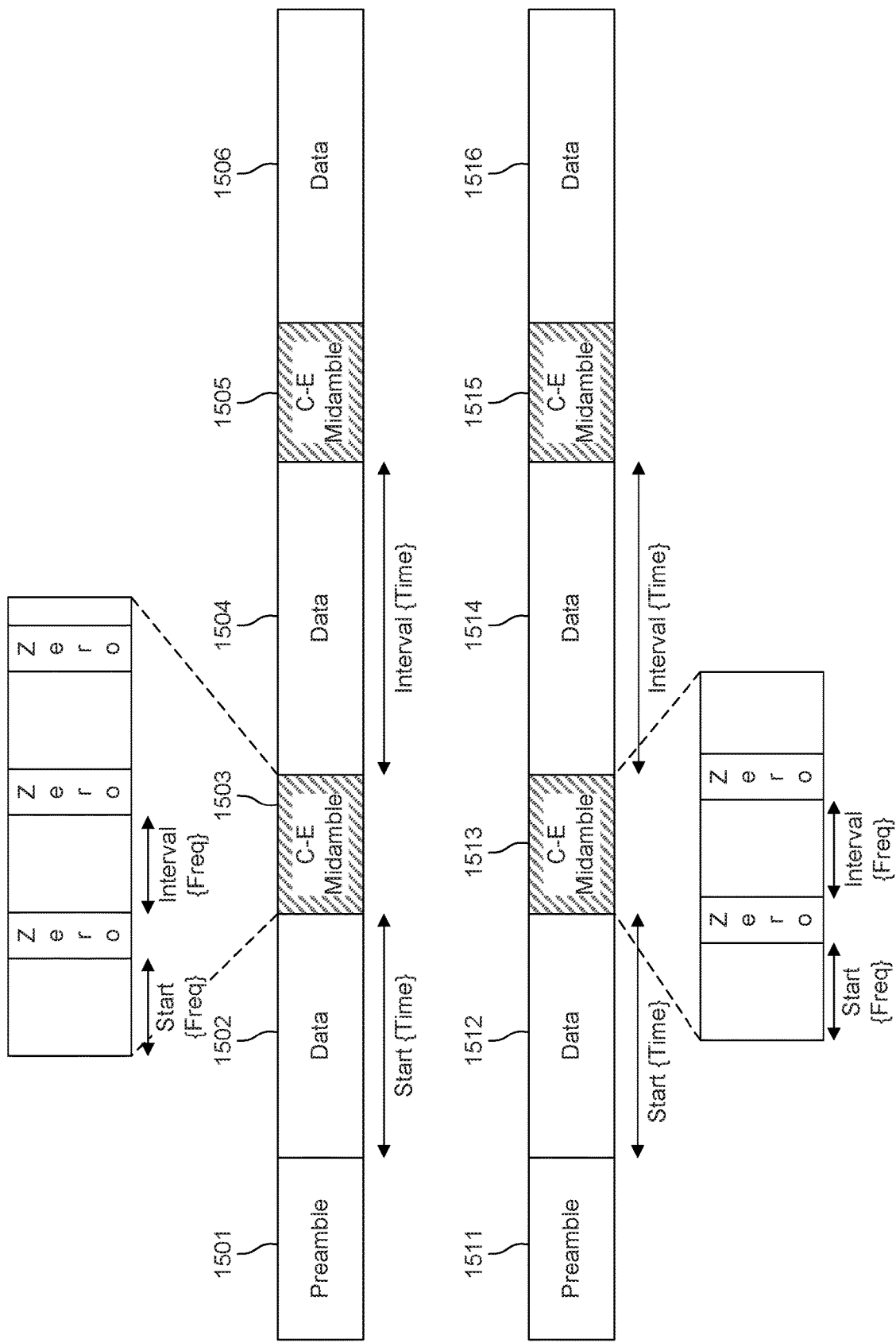
FIG. 15 is a diagram illustrating an example partial power collision estimation midamble according to this application.

In one example, the CE midamble may comprise of an LTF signal, for example, the EHT-LTF or HE-LTF, with a signalled set of punctured sub-carriers with no power transmitted on them. For example, a starting subcarrier and subcarrier interval may be signalled by the CE midamble signalling, for example, the EHT preamble. As shown in FIG. 15, a first PPDU may comprise preamble 1501, data 1502, 1504 and 1506, and C-E midamble 1503 and 1505. A second PPDU may comprise preamble 1511, data 1512, 1514 and 1516, and C-E midamble 1513 and 1515.

Figure 16:
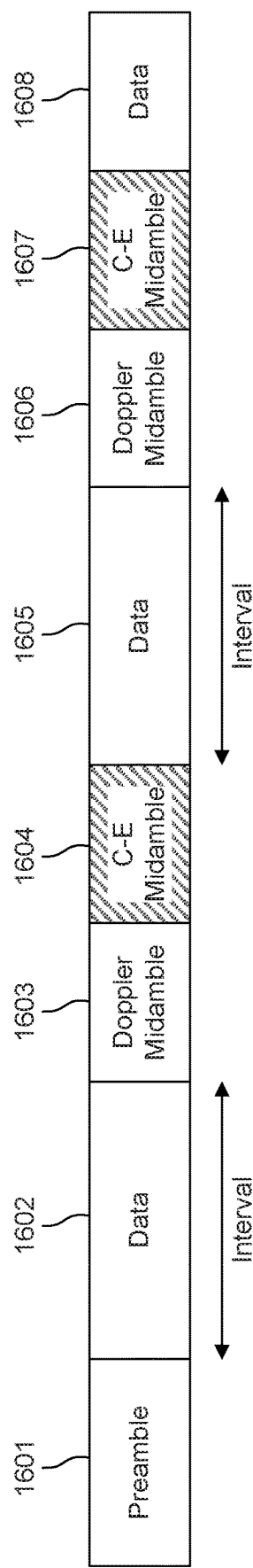
FIG. 16 is a diagram illustrating an example combined Doppler and collision estimation midamble according to this application.

Embodiments for partial power midamble for collision estimation and Doppler will be described with reference FIG. 16. FIG. 16 illustrates an example combined Doppler and collision estimation midamble. As illustrated in FIG. 16, the Doppler midamble 1603 and 1606 defined in 802.11ax may be combined with the CE estimation midamble. In this case, an extra OFDM symbol may be added on to the Doppler Estimation midamble for SINR estimation as shown in FIG. 16. As shown in FIG. 16, the PPDU may also comprise preamble 1601, data 1602, 1605 and 1608, and C-E midamble 1604 and 1607.

Figure 17:
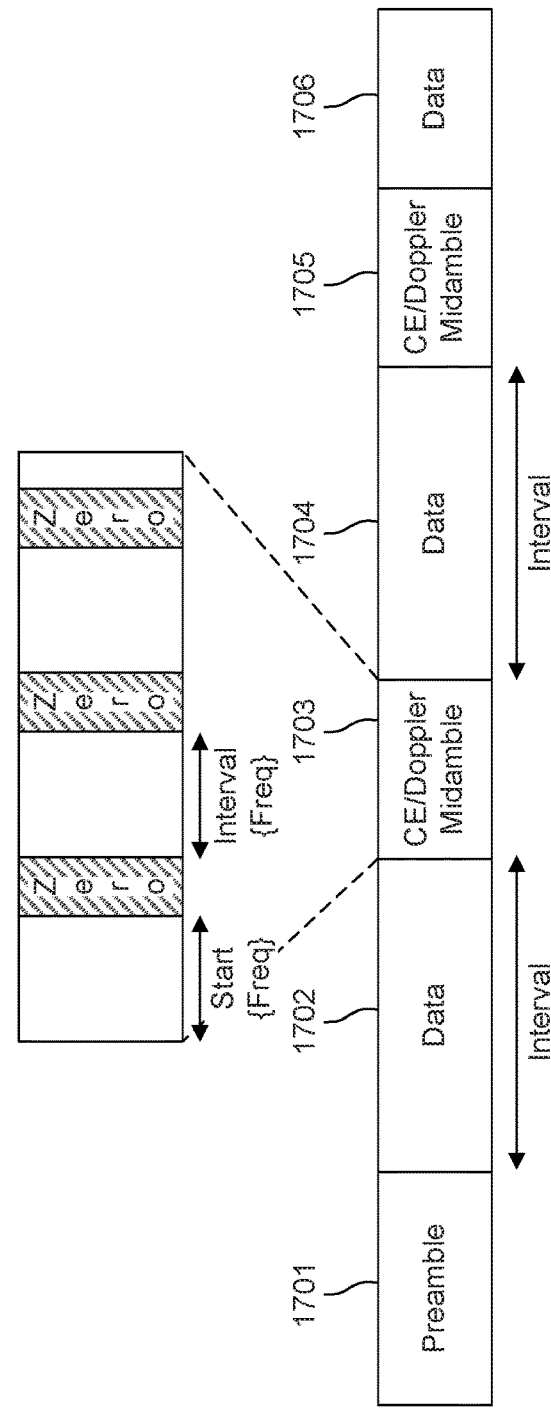
FIG. 17 is a diagram illustrating an example Doppler midamble punctured for collision estimation according to this application.

Alternatively or additionally, the Doppler midamble may be punctured with zeros to enable SINR and collision as illustrated in FIG. 17. As shown in FIG. 17, the PPDU may comprise preamble 1701, data 1702, 1704 and 1706, and CE/Doppler midamble 1703 and 1705.

Embodiments for no power pilots for collision estimation will be described below.

In one embodiment, each OFDM symbol may have no-power pilots at specific locations within the packet. In current 802.11ax packets, the following numerology is used: Pilot subcarriers: 26-tone with 2 pilots; 52-tone with 4 pilots; 106-tone with 4 pilots; 242-tone with 8 pilots; 484-tone with 16 pilots; and 996-tone with 16 pilots.

In one embodiment, an equal number of no-power pilots may be placed in each RU. Alternatively or additionally, a reduced number of no-power pilots may be placed in each RU such that: no-power pilot subcarriers: 26-tone with 1 pilots\; 52-tone with 2 pilots; 106-tone with 2 pilots; 242-tone with 4 pilots; 484-tone with 8 pilots; and 996-tone with 8 pilots.

The location of the pilots may be STA specific or BSS specific and the pattern may be static or dynamic.

Embodiments for no power resource units for collision estimation are described herein.

Figure 18:
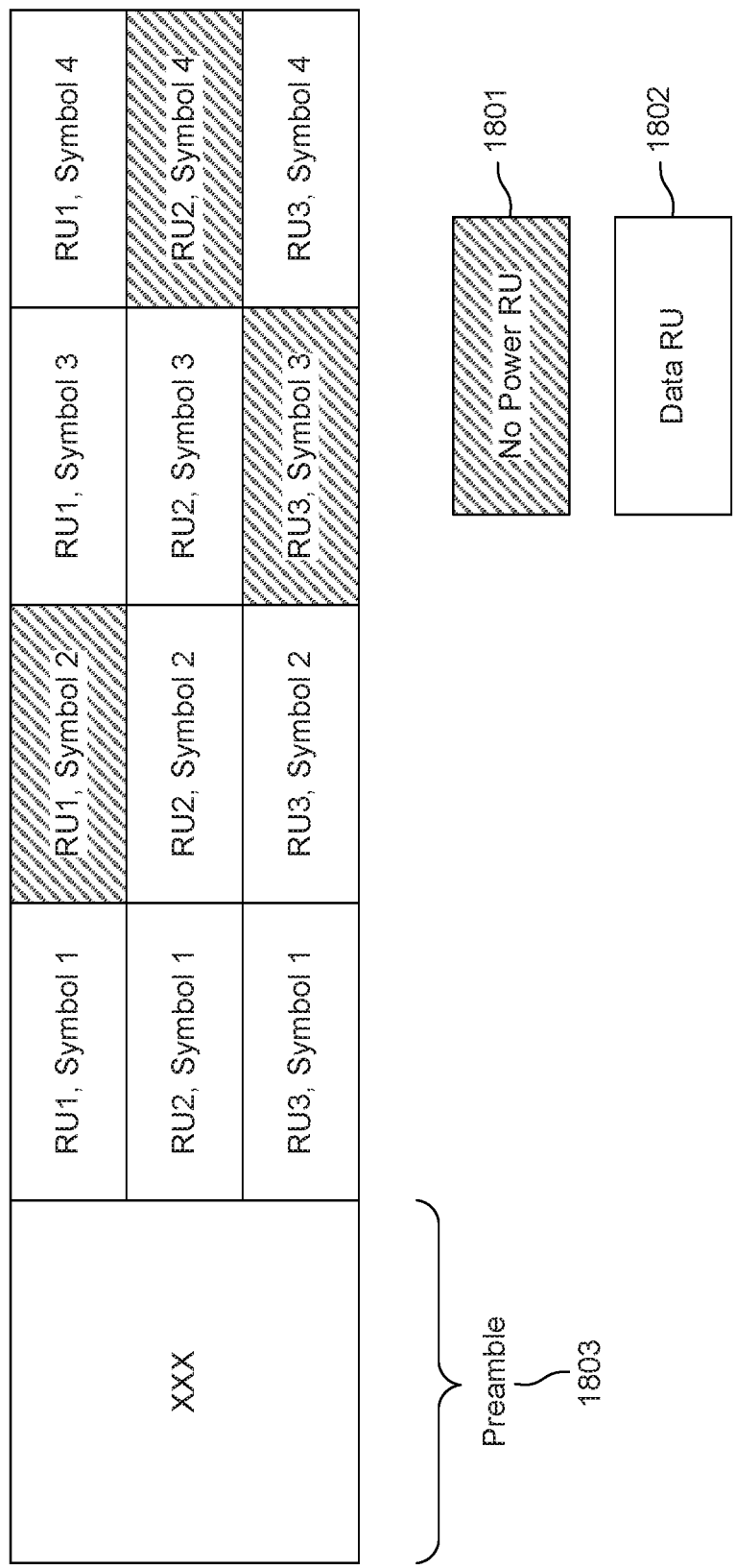
FIG. 18 is a diagram illustrating an example no power resource units for collision estimation according to this application.

FIG. 18 illustrates an example no power resource units for collision estimation. An RU or a partial RU may be set to no-power transmission to enable collision estimation. As an RU extends for the duration of the packet, an index of OFDM symbols within the RU may be set to no-power to reduce the overhead. It is noted that different RUs may have different frequencies/distributions of no power RU symbols based on the collision behavior of the STAs that is scheduled. As shown in FIG. 18, no power RU 1801 may comprise: RU1, symbol2; RU3, symbol3; and RU2, symbol4. Data RU 1802 may comprise other elements shown in FIG. 18.

Embodiments for collision estimation and collision aware HARQ procedure are described herein.

Figure 19:
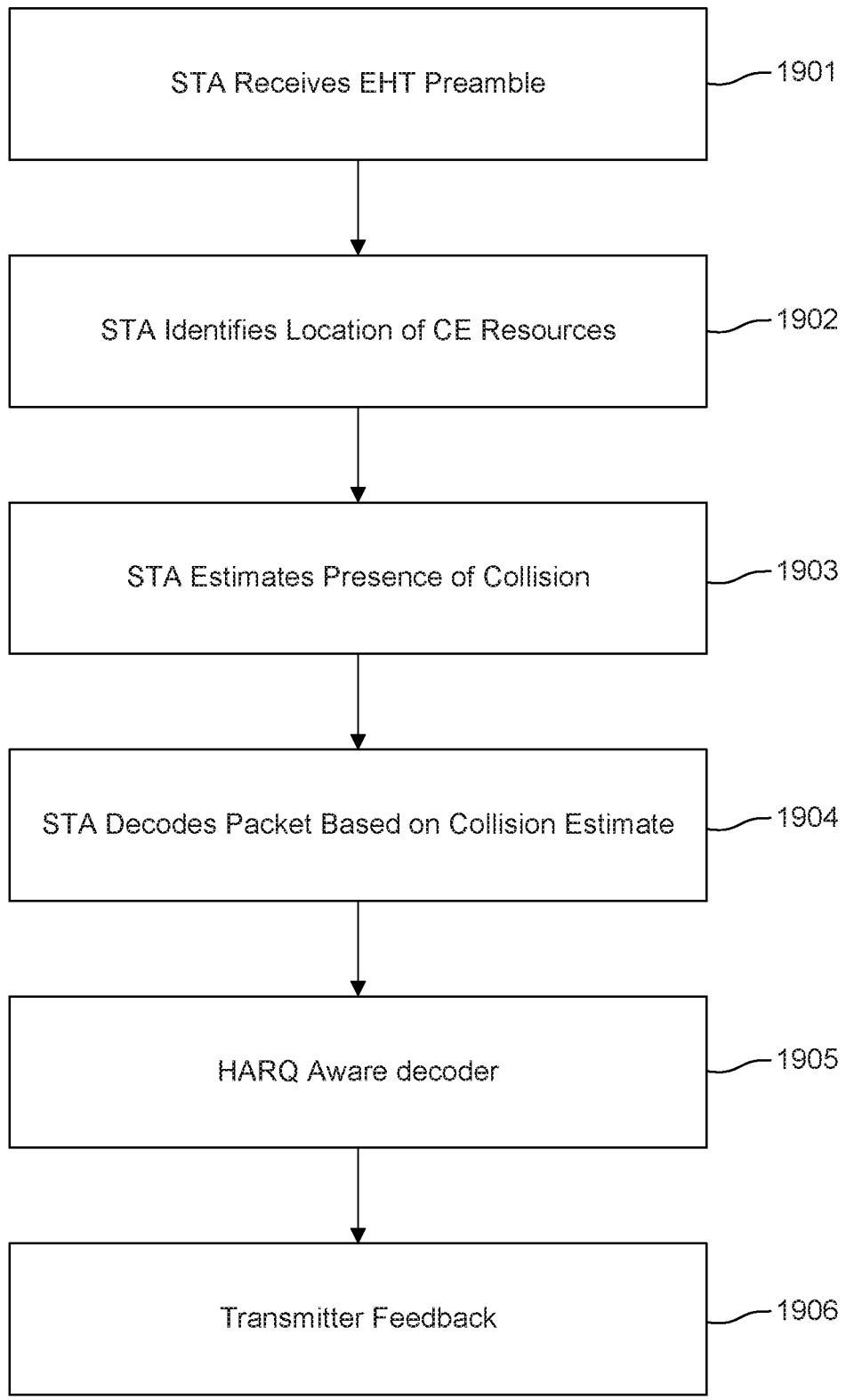
FIG. 19 is a diagram illustrating an example procedure for collision estimation in collision aware HARQ according to this application.

FIG. 19 illustrates an example procedure for collision estimation in collision aware HARQ. In this procedure, STA-specific Collision Estimation may be assumed.

At 1901, a STA may receive EHT preamble.

At 1902, the STA may identify location of STA-specific Collison Estimation Resources. This may include both no-power and powered resources.

At 1903, the STA may estimate presence of collision. This may be based on an interference metric, for example, the SINR variation, interference power variation, over the packet duration, or the like.

At 1904, the STA may decode the packet based on collision estimate. In one example, the STA may implement the HARQ aware decoder at 1905 and combine the packet if there is no collision. Then, at 1906, a transmitter will send feedback. In another example, the STA may estimate that it is operating in the no-HARQ range (i.e. ARQ is better than HARQ) and send a request to the AP to turn off HARQ transmissions. It is noted that in CC HARQ, the transmissions may be the same. However, in IR-HARQ, the transmissions may be different and if ARQ is used, the best RV may be transmitted always.

Figure 20:
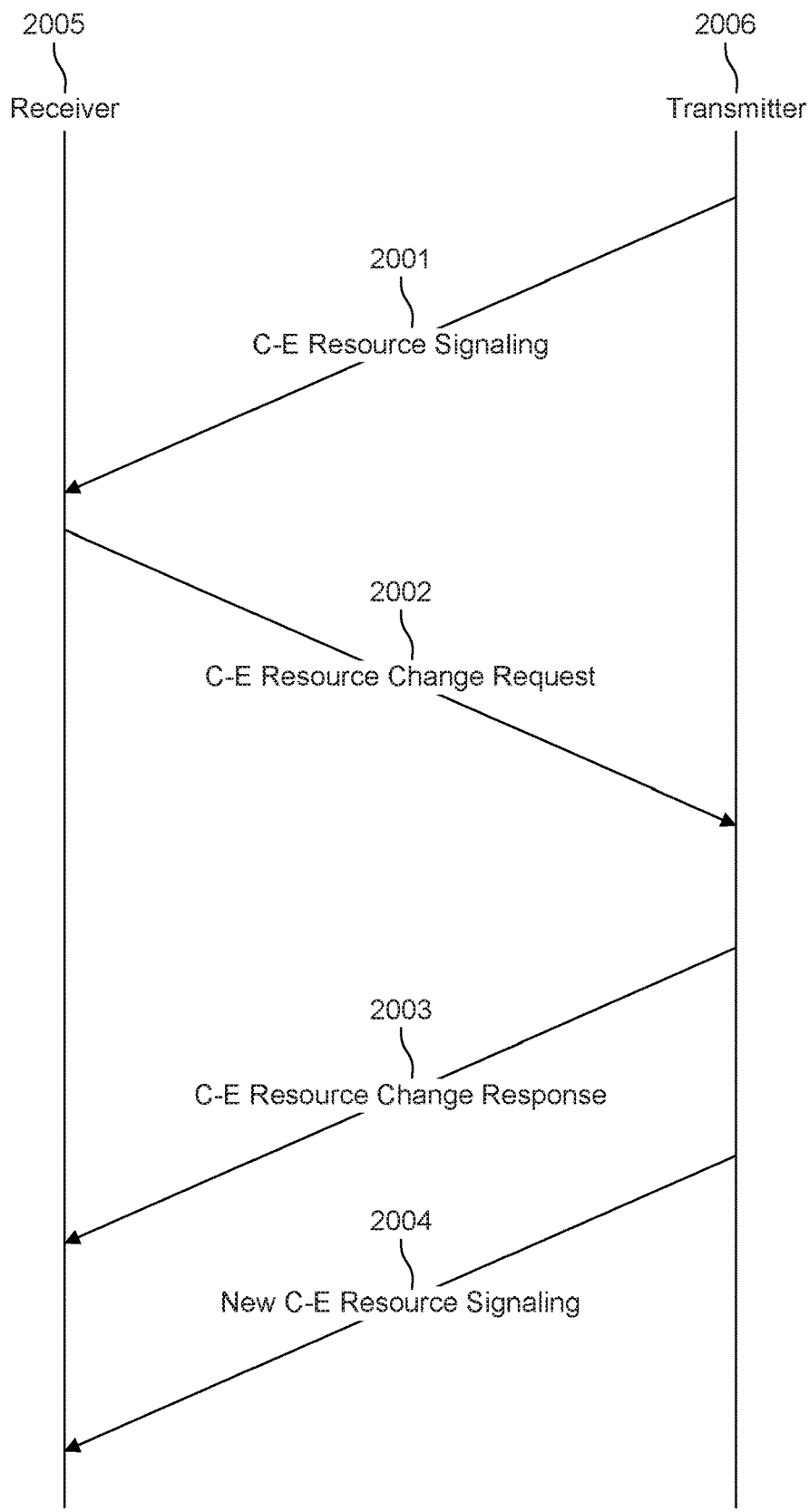
FIG. 20 is a diagram illustrating an example receiver initiate collision estimation resource change according to this application.

The STA/AP may request that the AP/STA change its Collision Estimation resources to enable better estimation of the interference from other colliding STAs. FIG. 20 illustrates an example of collision estimation resource change processes. As shown in FIG. 20, there are a receiver 2005 and a transmitter 2006.

At 2001, a WTRU (e.g., receiver 2005) may receive C-E resource signaling from an AP (e.g., transmitter 2006). Then, at 2002, the WTRU may transmit C-E resource change request to the AP. Then, at 2003, the AP may transmit C-E resource change response to the WTRU. Then, at 2004, the AP may transmit new C-E resource signaling to the WTRU. To be more specific, in one embodiment, the STA/AP may be able to suggest possible CE resources by reviving the LLRs of the received packet and identify resources with LLRs close to zero (i.e. the probability of a one or a zero is equal implying that the performance is uncertain). In one example, the STA/AP may send a CE resource request packet indicating the desired resource to the transmitter.

Although the features and elements of the present invention are described in the preferred embodiments in particular combinations, each feature or element can be used alone without the other features and elements of the preferred embodiments or in various combinations with or without other features and elements of the present invention.

Although the solutions described herein consider 802.11 specific protocols, it is understood that the solutions described herein are not restricted to this scenario and are applicable to other wireless systems as well.

Although SIFS is used to indicate various inter frame spacing in the examples of the designs and procedures, all other inter frame spacing such as RIFS, AIFS, DIFS or other agreed time interval could be applied in the same solutions.

Although four RBs per triggered TXOP are shown in some figures as example, the actual number of RBs/channels/bandwidth utilized may vary.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a station (STA), the method comprising:
  receiving low rate range extension (LRRE) information from an access point (AP); and
  determining whether a first condition is satisfied,
  wherein on a condition that the first condition is satisfied,
    sending a mode change request to the AP to change an operation mode to a LRRE hybrid automatic repeat request (HARQ) mode;
    receiving a response to the mode change request from the AP; and
    communicating with the AP using a plurality of physical layer convergence procedure (PLCP) protocol data units (PPDUs), wherein each of the plurality of PPDUs comprises at least one field for enabling transmissions between the STA and the AP under the first condition and a LRRE HARQ mode indication.

2. The method of claim 1, wherein the at least one field comprises a plurality of fields for enabling transmissions in a 6 GHz band.

3. The method of claim 2, wherein the plurality of fields for enabling transmissions in the 6 GHz band comprise:
  at least one high efficient 6 GHz short training field (HE-6 GHz-STF), at least one HE 6 GHz long training field (HE-6 GHz-LTF), and at least one HE 6G Signal field (HE-6 GHz-SIG).

4. The method of claim 2, wherein the plurality of fields for enabling transmissions in the 6 GHz band comprise:
  at least one extremely high throughput 6 GHz short training field (EHT-6 GHz-STF), at least one EHT 6 GHz long training field (EHT-6 GHz-LTF), and at least one EHT 6 GHz signal field (EHT-6 GHZ-SIG).

5. The method of claim 1, wherein the at least one field comprises:
  at least one extremely high throughput short training field (EHT STF), at least one EHT long training field (EHT LTF), at least one EHT Signal field (EHT SIG), and at least one EHT mark field (EHT Mark).

6. The method of claim 1, wherein the first condition is a predetermined distance from the STA to the AP.

7. The method of claim 1, wherein the first condition is a predetermined channel quality value.

8. The method of claim 1, wherein the at least one field comprises a first subfield for indicating a generation of the PPDU.

9. A station (STA), comprising:
  a receiver configured to receive low rate range extension (LRRE) information from an access point (AP);
  a transmitter; and
  a processer configured to determine whether a first condition is satisfied by the STA wherein on a condition that the first condition is satisfied:
    the transmitter is configured to send a mode change request to the AP to change an operation mode to a LRRE hybrid automatic repeat request (HARQ) mode;
    the receiver is further configured to receive a response to the mode change request from the AP; and
    the STA is configured to communicate with the AP using a plurality of physical layer convergence procedure (PLCP) protocol data units (PPDUs), wherein each of the plurality of PPDUs comprises at least one field enabling transmissions between the STA and the AP under the first condition and a LRRE HARQ mode indication.

10. The STA of claim 9, wherein the at least one field comprises a plurality of fields for enabling transmissions in a 6 GHz band.

11. The STA of claim 10, wherein the plurality of fields for enabling transmissions in the 6 GHz band comprise:
  at least one high efficient 6 GHz short training field (HE-6 GHz-STF), at least one HE 6 GHz long training field (HE-6 GHz-LTF), and at least one HE 6G Signal field (HE-6 GHz-SIG).

12. The STA of claim 10, wherein the plurality of fields for enabling transmissions in the 6 GHz band comprise:
  at least one extremely high throughput 6 GHz short training field (EHT-6 GHz-STF), at least one EHT 6 GHz long training field (EHT-6 GHz-LTF), and at least one EHT 6 GHz signal field (EHT-6 GHz-SIG).

13. The STA of claim 9, wherein the at least one field comprises:
  at least one extremely high throughput short training field (EHT STF), at least one EHT long training field (EHT LTF), at least one EHT Signal field (EHT SIG), and at least one EHT mark field (EHT Mark).

14. The STA of claim 9, wherein the first condition is satisfied when a current distance between the STA and the AP is greater than a distance value.

15. The STA of claim 9, wherein the first condition is satisfied when a channel quality of a channel used by the STA is less than a channel quality value.

16. The STA of claim 9, wherein the at least one field comprises a first subfield for indicating a generation of the PPDU.

* * * * *